US007005828B2

(12) United States Patent
Karikomi

(10) Patent No.: US 7,005,828 B2
(45) Date of Patent: Feb. 28, 2006

(54) CONTROL DEVICE FOR ELECTRIC MOTOR

(75) Inventor: Takaaki Karikomi, Sagamihara (JP)

(73) Assignee: Nissan Motor Co., Ltd., Yokohama (JP)

( * ) Notice: Subject to any disclaimer, the term of this patent is extended or adjusted under 35 U.S.C. 154(b) by 182 days.

(21) Appl. No.: 10/629,896

(22) Filed: Jul. 30, 2003

(65) Prior Publication Data

US 2004/0100222 A1    May 27, 2004

(30) Foreign Application Priority Data

Jul. 31, 2002  (JP)  ............................ P2002-222623
Jul. 7, 2003   (JP)  ............................ P2003-271330

(51) Int. Cl.
H02P 5/28    (2006.01)
H02P 7/36    (2006.01)

(52) U.S. Cl. ...................... 318/801; 318/727; 318/798; 318/799; 318/809; 318/811

(58) Field of Classification Search .................. 363/34, 363/37, 21.1, 21.18, 39–41, 74; 318/800, 318/801, 807, 809, 812, 811, 806, 727, 778, 318/779, 798, 799, 805, 808
See application file for complete search history.

(56) References Cited

U.S. PATENT DOCUMENTS 5,623,192 A  *  4/1997  Yamamoto ................ 318/811
5,959,430 A  *  9/1999  Yuki et al. ................. 318/805
6,552,509 B1 *  4/2003  Veltman ..................... 318/807
6,583,593 B1 *  6/2003  Iijima et al. ................ 318/254

(Continued)

OTHER PUBLICATIONS

Kondo et al., "Armature Current Locus Based Estimation Method of Rotor Position of Permanent Magnet Synchronous Motor without Mechanical Sensor", 1995, IEEE, pp. 55-60.*

(Continued)

Primary Examiner—Marlon T. Fletcher
Assistant Examiner—Patrick Miller
(74) Attorney, Agent, or Firm—Foley & Lardner LLP

(57) ABSTRACT

Corresponding to a target torque, the control device calculates a target value of a feature based on at least one of the length of a long axis of a current vector locus and the length of the short axis and further superimposes a superimposed current on a drive current for the motor, the superimposed current having a frequency different from the frequency of the drive current. Further, the control device detects an actual value of the feature based on at least one of the length of a long axis of a current vector locus of the superimposed current and the length of the short axis of the same and finally detects a phase angle of the motor based on the target value and the actual value for the feature. The manipulation of a detecting phase is performed by feedback of a feature obtained by the magnitude of the superimposed current. That is, when the actual feature is more than the target value, the detecting phase is advanced. Conversely, when the actual feature is less than the target value, the detecting phase is delayed.

40 Claims, 31 Drawing Sheets

U.S. PATENT DOCUMENTS

| | | | | |
|---|---|---|---|---|
| 6,636,008 B1 * | 10/2003 | Yamada et al. | .............. | 318/254 |
| 6,700,400 B1 * | 3/2004 | Atarashi | ...................... | 324/772 |
| 6,762,581 B1 * | 7/2004 | Karikomi | .................... | 318/800 |
| 6,788,024 B1 * | 9/2004 | Kaneko et al. | ............. | 318/807 |
| 6,801,011 B1 * | 10/2004 | Ide | ............................. | 318/700 |
| 2003/0020429 A1 * | 1/2003 | Masaki et al. | ............... | 318/727 |
| 2004/0051495 A1 * | 3/2004 | Kaneko et al. | ............. | 318/807 |

OTHER PUBLICATIONS

T. Nishida et al., "Evaluation of Estimation Accuracy in Mechanical Sensor-less Rotor Position Detecting Method of Permanent Magnet Motor Using Current Vector Locus", No. 683, National Convention of Society for Industrial Application, Institute of Electric Engineers, 1994, pp. 195-198.

* cited by examiner

LENGTH OF LONG AXIS (EVERY DRIVE CURRENT ia)

LENGTH OF LONG AXIS (EVERY DRIVE CURRENT ia)

LONG AXIS × SHORT AXIS (EVERY DRIVE CURRENT ia)

LONG AXIS × SHORT AXIS (EVERY DRIVE CURRENT ia)

CONTROL DEVICE FOR ELECTRIC MOTOR

BACKGROUND OF THE INVENTION

1. Field of the Invention

The present invention relates to a control device for an electric motor. More in detail, this invention relates to a sensor-less control technique for a three-phase synchronous motor equipped with permanent magnets for a rotor, which will be called as "internal permanent magnet (IPM) motor" hereinafter.

2. Description of Related Art

In order to control the rotating speed of an electric motor to be driven by an inverter, it is necessary to detect the positions (phase) of poles of a rotor. As a method of detecting the position of a rotor without any sensor, there is an article titled "Evaluation for estimated accuracy in the positional sensor-less field detecting method for PM (permanent magnet) motor, using current vector locus" (No. 683, at National Convention in 1994 of Society for Industrial Application, Institute of Electric Engineers). The article describes a technique to detect a long axis of current vector locus in a high-frequency space by superimposing a high-frequency current on a drive current, thereby detecting the phase of a rotor.

SUMMARY OF THE INVENTION

The above-mentioned technique has a problem as follows. First of all, it is generally noted an electric motor has two characteristic features.

First, the more a q-axis current is increased, the more a q-axis inductance is reduced due to magnetic saturation, thereby causing a high-frequency current vector locus to approach a perfect circle. - - - ①

Second, due to the magnetic saturation, a position allowing magnetic flux to flow easiest and another position allowing magnetic flux to flow hardest move together with the phase of current. - - - ②

With the delay in either errors or indication of a drive current as a start, if a q-axis current is increased due to the above characteristic feature ②, then a phase of detection is delayed, thereby causing a further increasing of the q-axis current. As a result, when an elliptical current becomes a perfect circle due to the above characteristic feature ① and when the correlation of the characteristic feature ② approaches approximately 1 so that the long axis of an ellipse does not represent a d-axis but a current phase, the control accuracy is deteriorated at the motor's driving under a high load condition.

The present invention is provided to improve the art described above. An object of the present invention is to provide a control device for an electric motor that enables a sensor-less operation even under a high load driving condition.

According to the present invention, the above-mentioned object is accomplished by a control device for an electric motor, comprising: an inverter circuit connected to a direct-current power source to convert a power from the direct-current power source to an alternating current power, thereby driving the electric motor by the alternating current power; a control unit for controlling the operation of the inverter circuit on the basis of a target torque; a superimposing unit for superimposing a superimposed current on a drive current for driving the electric motor, the superimposed current having a frequency different from a frequency of the drive current; a feature target generating unit for calculating a target value of a feature based on at least one of the length of a long axis of a current vector locus and the length of a short axis thereof, corresponding to the target torque; a separating unit for separating the superimposed current from a current supplied to the electric motor; an actual feature detecting unit detecting an actual value of the feature based on at least one of the length of a long axis of a current vector locus of the superimposed current separated by the separating unit and the length of a short axis thereof, the superimposed current having a different frequency from that of the drive current; and a phase angle detecting unit for detecting a phase angle of the electric motor on the basis of the target value calculated by the feature target generating unit and the actual value detected by the actual feature detecting unit, wherein the control unit controls the operation of the inverter circuit on the basis of the phase angle detected by the phase angle detecting unit.

In the present invention, there is also provided a control device for an electric motor, comprising: an inverter circuit connected to a direct-current power source to convert a power from the direct-current power source to an alternating current power, thereby driving the electric motor by the alternating current power; a control unit for controlling the operation of the inverter circuit on the basis of a target torque; a feature target generating unit for calculating a target value of a feature based on at least one of the length of a long axis of a current vector locus and the length of a short axis thereof, corresponding to the target torque; a superimposing unit for superimposing a superimposed current on a drive current for driving the electric motor, the superimposed current having a different frequency from that of the drive current; a separating unit for separating the superimposed current from a current supplied to the electric motor; a d-axis phase angle detecting unit for detecting a d-axis phase angle from a value of the superimposed current separated by the separating unit; an actual feature detecting unit for detecting an actual value of the feature based on at least one of the length of a long axis of a current vector locus of the superimposed current and the length of a short axis thereof; a correction angle calculating unit for calculating a correction angle on the basis of the target value calculated by the feature target generating unit and the actual value detected by the actual feature detecting unit; and a phase angle correcting unit for correcting the d-axis phase angle by the correction angle; wherein the control unit controls the operation of the inverter circuit on the basis of the d-axis phase angle corrected by the phase-angle correcting unit.

Further, there is provided a method for controlling an electric motor having an inverter circuit connected to a direct-current power source to convert a power from the direct-current power source to an alternating current power for driving the electric motor, the method comprising: calculating a target value of a feature based on at least one of the length of a long axis of a current vector locus and the length of a short axis thereof, corresponding to a target torque for the electric motor; superimposing a superimposed current on a drive current for driving the electric motor thereby detecting an actual value of the feature based on at least one of the length of a long axis of a current vector locus of the superimposed current and the length of a short axis thereof, the superimposed current having a different frequency from that of the drive current; detecting a phase angle of the electric motor on the basis of the target value and the actual value; and controlling the operation of the inverter circuit on the basis of the phase angle.

DESCRIPTION OF THE PREFERRED EMBODIMENT

Referring to the accompanying drawings, embodiments of the present invention will be described below.

Figure 1:
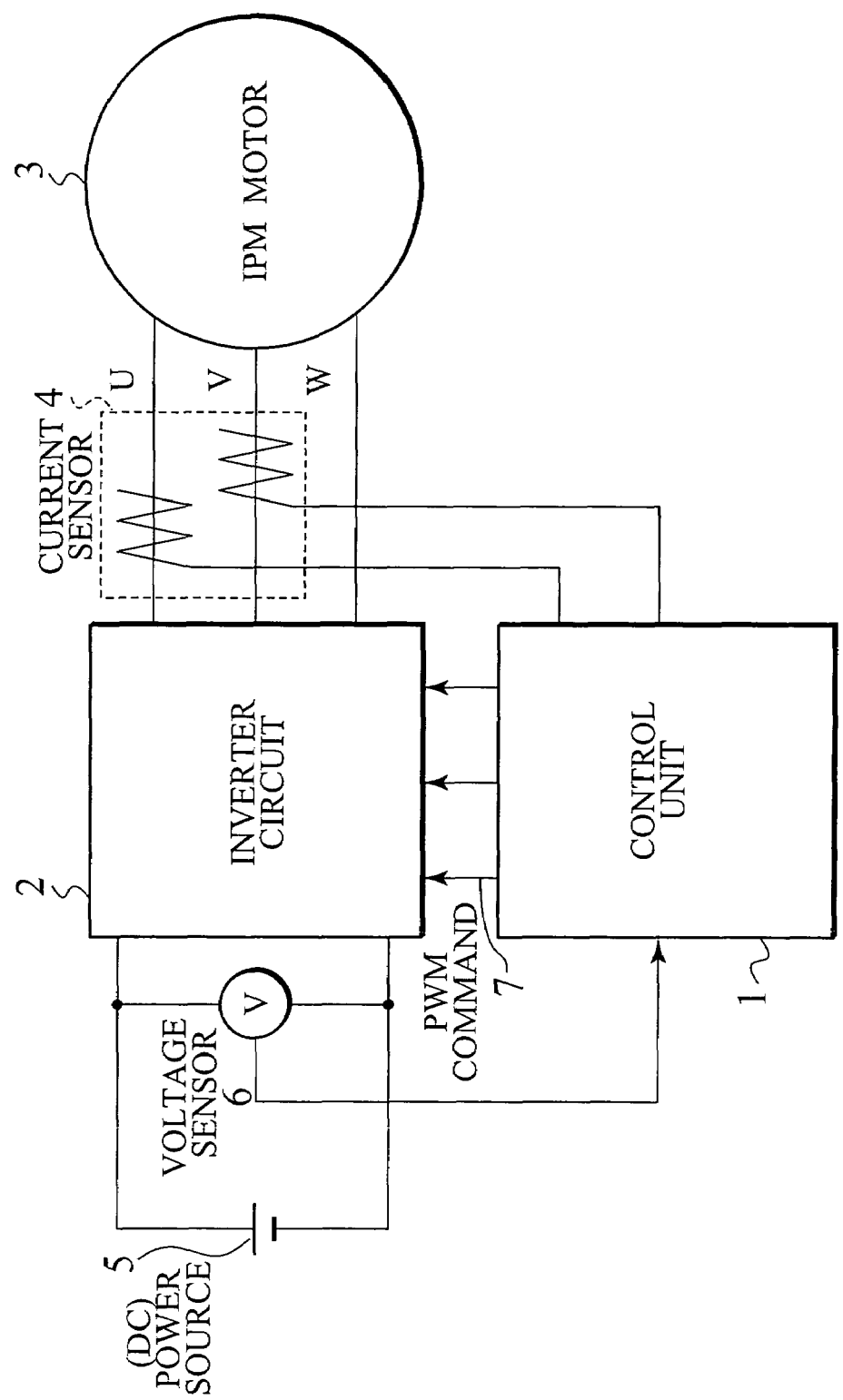
FIG. 1 is a block diagram showing the whole structure of a motor control system equipped with a control device in accordance with one embodiment of the present invention.

FIG. 1 is a block diagram showing the whole structure of a motor control system, in accordance with one embodiment of the present invention.

In FIG. 1, a control device 1 whose details will be described later is constructed so as to input respective signals of a current sensor 4 and a voltage sensor 6, further calculate a PWM (Pulse Width Modulation) command 7 and transmit it to an inverter circuit 2. The inverter circuit 2 converts a direct-current power of a power source 5 to a three-phase power corresponding to the PWM command 7 thereby to drive an IPM (Internal Permanent Magnet) motor 3. The current sensor 4 detects two-phase currents (e.g. U-phase current and V-phase current) of the three-phase power transmitted from the inverter circuit 2 to the IPM motor 3. While, the voltage sensor 6 detects an output voltage of the power source 5, that is, an input voltage inputted to the inverter 2. Detection values of the current sensor 4 and the voltage sensor 6 are transmitted to the control device 1 to calculate the PWM command 7. Noted that with the establishment of a relationship (U+V+W=0) about the three-phase currents, if only two currents are detected, the remaining current can be calculated automatically.

Figure 2:
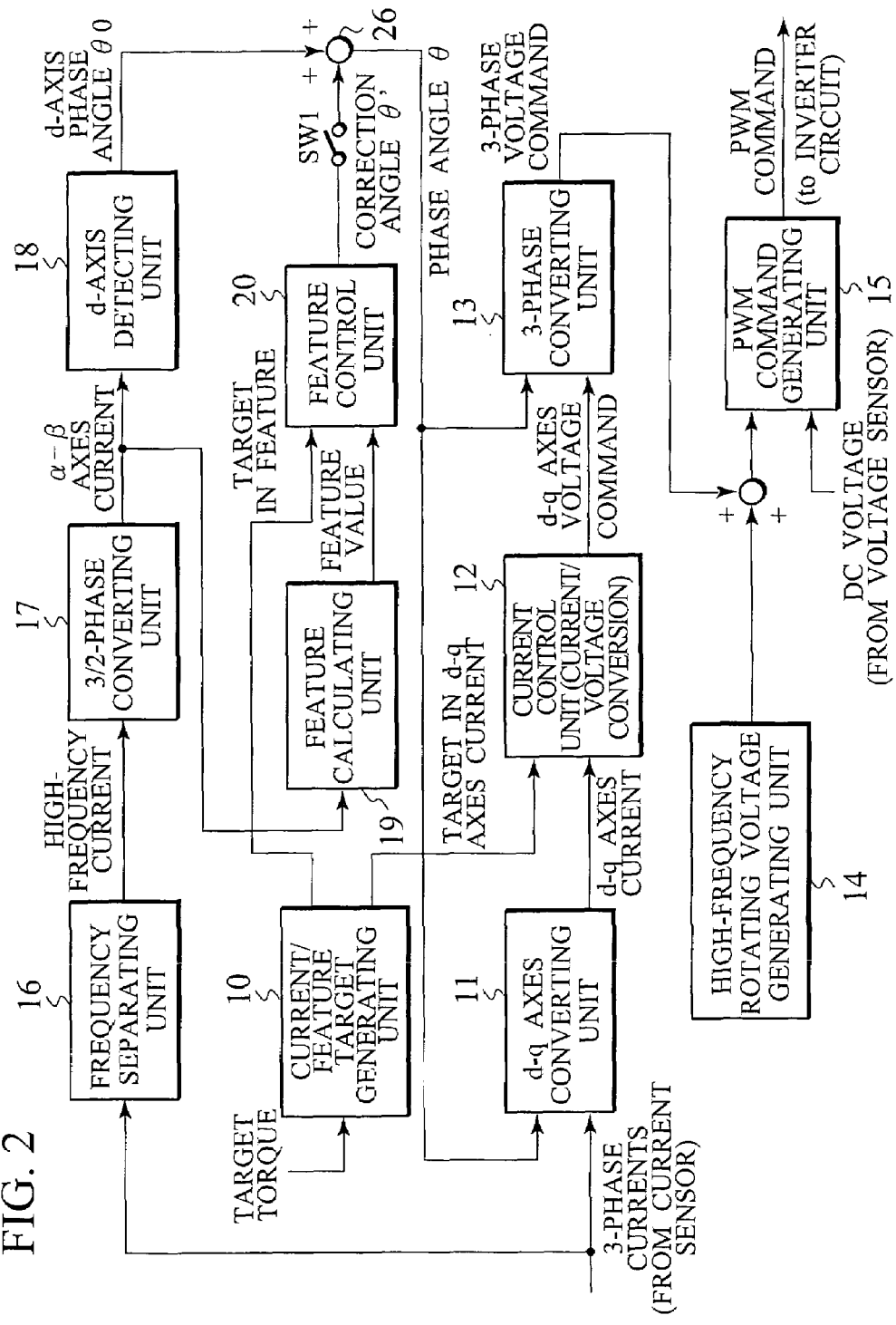
FIG. 2 is a block diagram showing the details of the control device of FIG. 1, in accordance with the first embodiment of the present invention.

FIG. 2 is a block diagram showing the details of the control device 1, in accordance with the first embodiment of the invention.

In FIG. 2, a current/characteristic feature target generating unit 10 generates a target value in d-axis current, a target value in q-axis current and a characterizing amount based on a target torque (e.g. manipulating amount for accelerator pedal) provided from outside. Noted that "characteristic feature" is a value based on at least one of the length of a long axis and the length of a short axis of a current vector locus. As the above value, for example, there are the length (a) of a long axis, a length (b) of a short axis, a+b, a×b, $\sqrt{(a^2+b^2)}$, a/b, $\sqrt{(a^2+b^2)}\div(a+b)$, etc. which will be described later in detail.

A d-axis/q-axis converting unit 11 calculates a d-axis current and a q-axis current by the three-phase currents obtained by the current sensor 4 of FIG. 1 and a phase angle θ (its details described later).

A current control unit 12 (conversion of current to voltage) carries out, for example, a PI control (known proportional/integral control) to calculate a d-axis voltage command to allow the target value in q-axis current to coincide with a d-axis current and a q-axis voltage command to allow the target value in q-axis current to coincide with a q-axis current.

Note, the above current control may contain a noninterference control and a low-pass filter to remove a high-frequency component in the three-phase currents.

A three-phase converting unit 13 calculates three-phase voltages commands on the basis of the d-axis voltage command, the q-axis voltage command and a phase angle θ and further outputs the so-obtained three-phase voltages commands.

A high-frequency rotating voltage-generating unit 14 (superimposing means for superimposing a superimposed current of higher frequency than that of a drive current) generates a rotating voltage of high frequency to transmit it to a PWM command-generating unit 15. Here noted that the above "rotating voltage" means a three-phase equilibrium voltage, representing a state that its voltage vector locus becomes a perfect circle when converted to an α/β-coordinate system as two-phase AC (alternating current) coordinate system, as shown in FIG. 3A. Since this rotating voltage is a high frequency voltage that does not synchronize the IPM motor 3, there is no possibility that the IPM motor 3 is rotated by the rotating voltage.

Figure 3B:
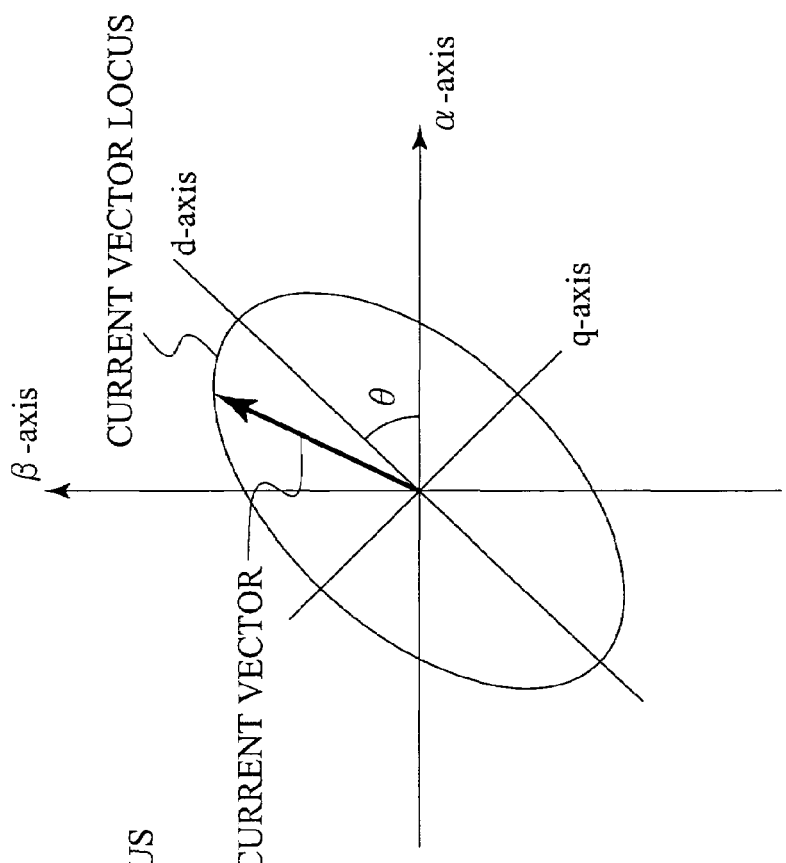
FIG. 3B is a diagram showing a current vector locus drawing an ellipse.
Figure 3A:
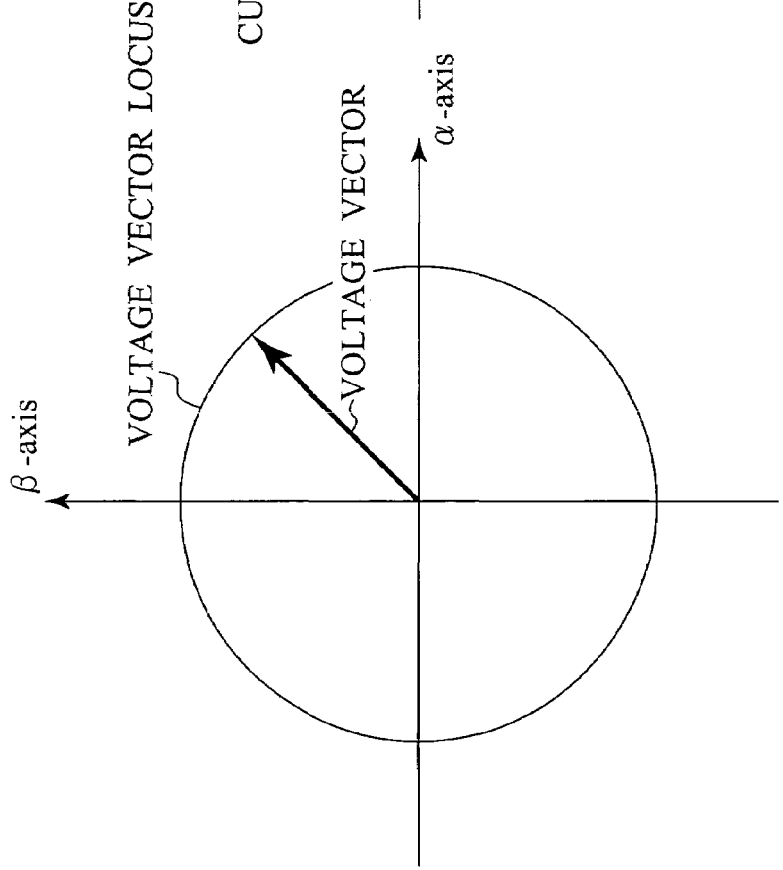
FIG. 3A is a diagram showing a voltage vector locus drawing a perfect circle.

While, if there is a difference in inductance between flux current and torque current as the IPM motor, its current vector locus becomes an ellipse expanding to a direction of d-axis, as shown in FIG. 3B.

The PWM command generating unit 15 inputs a voltage obtained by superimposing the rotating voltage from the high-frequency rotating voltage-generating unit 14 on the three-phase voltage command and a DC voltage brought by the voltage sensor 6 of FIG. 1, thereby to generate the PWM command 7. The inverter circuit 2 of FIG. 1 is controlled by the PWM command 7, while the IPM motor 3 is driven by a three-phase power generated from the inverter circuit 2.

A frequency-separating unit 16 (means for separating a superimposed current) separates a high-frequency current from a three-phase current of the current sensor 4 and further transmits the high-frequency current to a 3/2-phase converting unit 17.

The 3/2-phase converting unit 17 converts a three-phase current of high frequency from the frequency separating unit 16 to a two-phase current in the α/β-coordinate system of FIG. 3B and further transmits the so-converted two-phase current in the α/β-coordinate system to a d-axis detecting unit 18.

Figure 5:
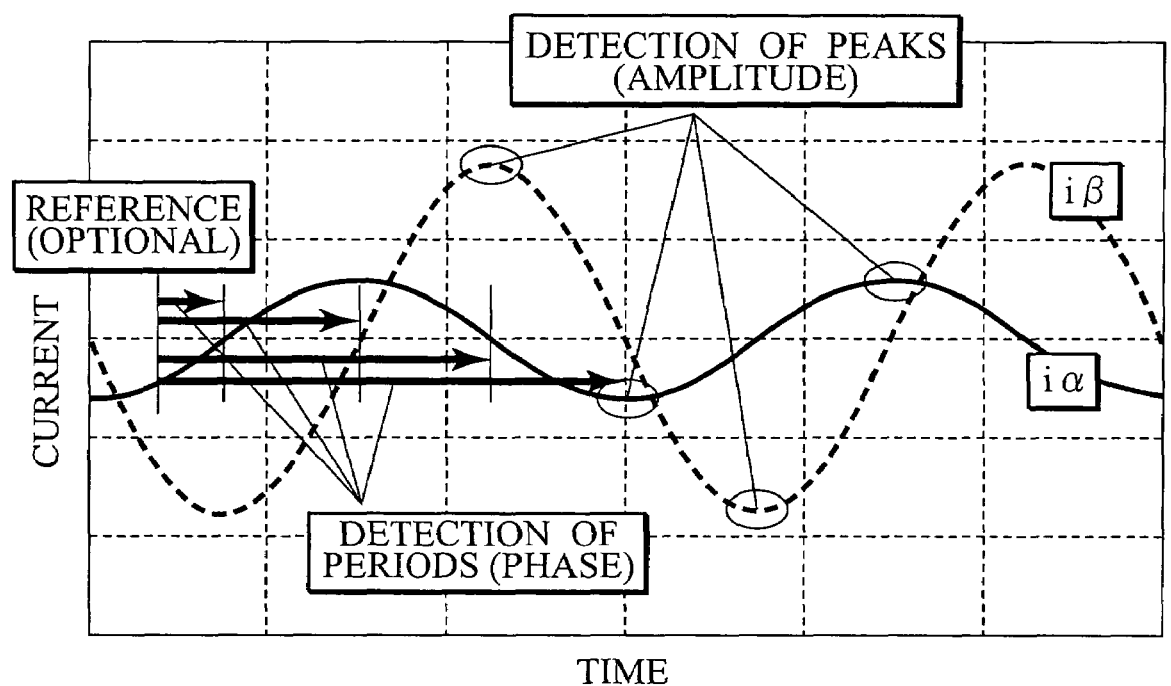
FIG. 5 is a diagram to explain a method of detecting phases $\phi i\alpha$ and $\phi i\beta$.

Regarding α-axis component iα and β-axis component iβ of the current vector as a result of converting to the α/β-coordinate system by the 3/2-phase converting unit 17, the d-axis detecting unit 18 (d-axis phase angle detecting unit) detects respective amplitudes Iα, Iβ by detecting their peaks of the components iα, iβ and further detects respective phases φiα, φiβ of the superimposed currents by detecting their zero-cross periods of the components iα, iβ, as shown in FIG. 5. In the α/β-coordinate system of FIG. 3B, an angle θ from the α-axis to the long axis (d-axis) of an ellipse is obtained by the following expressions (1).

$$\theta = \frac{1}{2}\tan^{-1}\left(\frac{2H}{A-B}\right), \quad (A < B) \quad (1)$$

$$\theta = \frac{1}{2}\tan^{-1}\left(\frac{2H}{A-B}\right) + (\pi/2), (A > B, H > 0)$$

$$\theta = \frac{1}{2}\tan^{-1}\left(\frac{2H}{A-B}\right) - (\pi/2), (A > B, H < 0)$$

$$\theta = \pi/4, \quad (A = B, H > 0)$$

$$\theta = -\pi/4, \quad (A = B, H < 0)$$

Note: $A = 1/(I\alpha)^2, B = 1/(I\beta)^2, H = -\frac{\cos(\psi i\alpha - \psi i\beta)}{I\alpha \times I\beta}$ $i\alpha = I\alpha \sin(\omega t + \psi_{i\alpha})$ $i\beta = I\beta \sin(\omega t + \psi_{i\beta})$ By the above expression (1), an angle θ between the α-axis and the β-axis is obtained within a zone of ±90 degrees.

In order to expand this angle θ up to a zone of ±180 degrees, there is employed a premise that there is no change in phase exceeding 90 degrees in accordance with a continuous detection. That is, as the later-mentioned flow chart of FIG. 4 starts, for example, every 100 μm, a phase does not change more than 90 degrees generally. Accordingly, in the continuous detection, when a phase changes from 89 degrees to −89 degrees, it is assumed that the phase changes from 89 degrees to 91 degrees (=−89+180 degrees). Similarly, when a phase changes from −89 degrees to 89 degrees, it is assumed that the phase changes from −89 degrees to −91 degrees (=89+180−360 degrees). Consequently, it is possible to detect an angle θ between α-axis and d-axis within a zone of ±180 degrees.

Noted that the initial phase at the first detection cannot be determined because of no presence of comparative object in change. In detail, when the calculation at the first detection results in 30 degrees, it is unclear whether the initial phase is 30 degrees or −150 degrees. Therefore, it is established at the first detection that the angle θ zones from −90 degrees to 90 degrees temporarily, in the above case, 30 degrees. Subsequently, at the later-mentioned polar judgment of N/S, the angle θ is detected within the zone of ±180 degrees.

An angle θ from the α-axis to the long axis (d-axis) of an ellipse detected at the d-axis detecting unit 18 is established as a d-axis phase angle $\theta_0$.

A characteristic-feature calculating unit 19 ("characteristic feature" actual value detecting means) calculates an actual characteristic feature (i.e. parameter) by both of the α-axis current and the β-axis current, of which details will be described later.

A characteristic-feature control unit 20 (correction angle calculating means) calculates a correction angle θ' by the actual characteristic feature and the above target value in the characteristic feature. That is, when the actual characteristic feature is larger than the target value in the characterizing amount, it is carried out to advance the detection phase. While, when the actual characteristic feature is smaller than the target value, it is carried out to delay the detection phase. In this feedback control, PI control method is used to establish a control gain by way of experiment.

For example, when the phase angle β of the drive current increases and the value of the characteristic feature decreases, the calculation of the correction angle θ' by the PI control method is carried out by using the following expression (2).

Noted, similarly to the case of the characteristic feature of $\sqrt{(a^2+b^2)}$ (a+b), when the value of the characteristic feature increases together with the increasing of the phase angle β of the drive current, the expression (2) is changed to the expression (2') described later.

$$\theta'(s) = -\left(K_p + \frac{K_i}{s}\right)\{ft^*(s) - ft(s)\} \quad (2)$$

θ': correction angle
ft*: target value in characteristic feature
ft: characteristic feature
$K_p$: proportional gain
$K_i$: integral gain
s: Laplace operator $$\theta'(s) = \left(K_p + \frac{K_i}{s}\right)\{ft^*(s) - ft(s)\} \quad (2')$$

As for the target value in characterizing amount at the current/characteristic feature target generating unit 10, it is noted that there are methods of changing the target value together with the target value in current, making the target value constant and so on. In any case, since the correction by the correction angle θ' is not applicable to a low load zone of small current, the activation/inactivation of control is executed depending on the amplitude in current.

That is, the switch SW1 is turned ON only when the IPM motor 3 is driven under a high load zone where its drive current detected by the current sensor 4 is more than a predetermined value.

When the switch SW1 is turned ON, the d-axis phase angle $\theta_0$ from the d-axis detecting unit 18 is added to the correction angle θ' from the characteristic-feature control unit 20 at an accumulator 26 (phase-angle correcting unit), whereby the d-axis phase angle $\theta_0$ is corrected with the correction angle θ', providing a phase angle θ. Then, the phase angle θ after correction is transmitted to the d-axis/q-axis converting unit 11 and the three-phase converting unit 13 for the above-mentioned calculation.

In the circuit of FIG. 2, therefore, when the IPM motor 3 is driven under the high load zone where its drive current detected by the current sensor 4 is more than the predetermined value, the phase angle θ corrected on the basis of the characterizing amount is used for calculation. When the IPM motor 3 operates except the high load zone, the d-axis phase angle $\theta_0$ generated from the d-axis detecting unit 18 is used as it is.

As mentioned above, if only constructed so as to correct the d-axis phase angle $\theta_0$ detected by the d-axis detecting unit 18 only at a high load zone where the drive current for the motor is more than a predetermined value, it is possible to stop the calculations of the correction angle θ' at the characteristic-feature calculating unit 19 and the characteristic-feature control unit 20 in such a low load zone that requires no correction for the phase angle, allowing the calculation load for the control device to be reduced.

FIG. 4 is a flow chart of the process to start the torque control in case of no magnetic saturation (out of a high load zone).

Figure 4A:
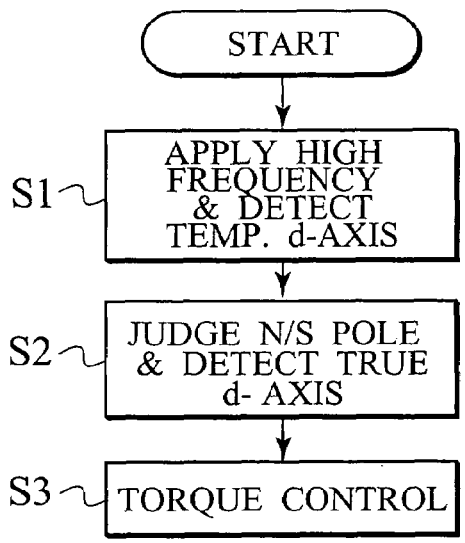
FIGS. 4A, 4B are flow charts of the process to start the torque control in case of no magnetic saturation (except a high load zone)

First, in FIG. 4A, at step S1, it is executed to detect a temporary d-axis by passing a high-frequency rotating current corresponding to a high-frequency rotating voltage from the high-frequency rotating voltage generating unit 14.

At step S2, it is executed to detect a true d-axis by the N/S polar judgment for specifying N-pole and S-pole of magnetic poles. As for the N/S polar judgment, there are a variety of methods of: (1) applying such high-frequency voltage as a large voltage to cause a saturation of flux thereby to detect a direction to deviate from the center of an ellipse; (2) applying a low-frequency sinusoidal voltage to only a d-axis at stopping thereby to compare a positive magnitude of the d-axis current with its negative magnitude; (3) applying positive and negative currents to only a d-axis thereby to compare amplitudes of high-frequency currents in both cases with each other, and so on. In this embodiment, any one of these methods is employed.

On the above detection of a true d-axis, namely, d-axis phase angle, the torque control is performed with use of the true d-axis at step S3. The contents of the torque control have been described on and after the previous descriptions about the current control unit 12.

Figure 4B:
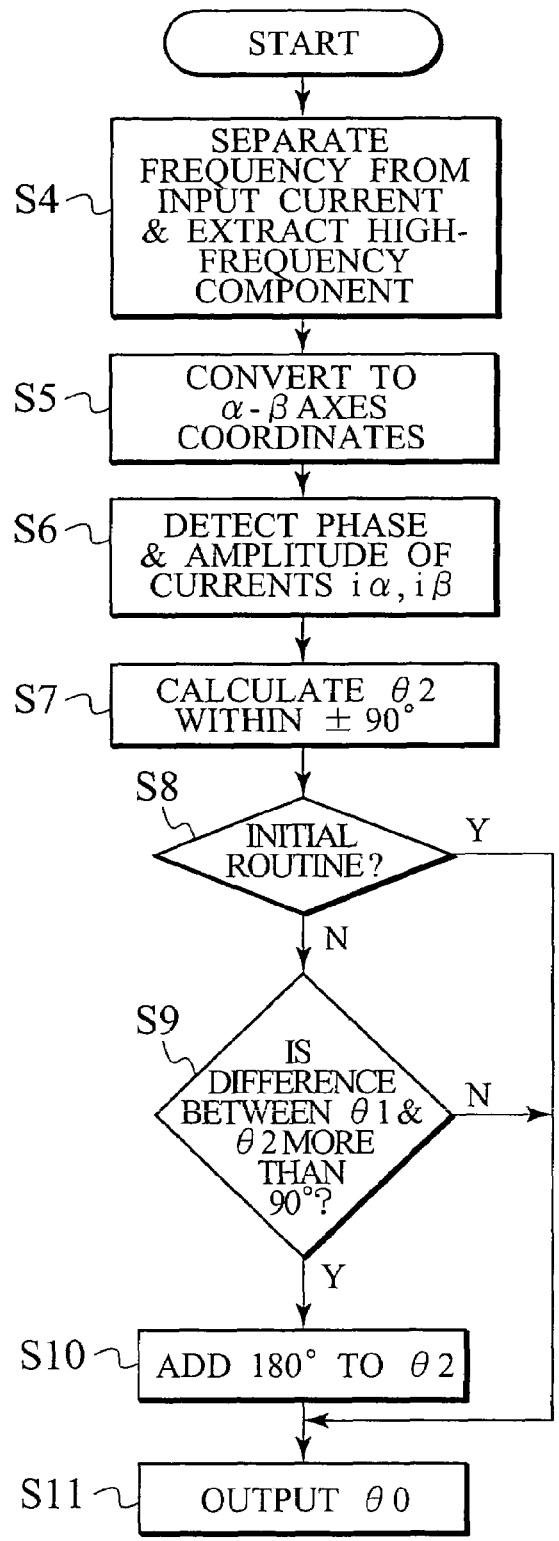

Next, at step S4 of FIG. 4B, it is executed to separate a high-frequency component from the current detected by the current sensor 4 (by the frequency separating unit 16). Then, at step S5, the high-frequency current is converted to the α/β-coordinate system to realize the state of FIG. 3B (by the 3/2-phase converting unit 17).

At step S6, as for both α-axis component iα and β-axis component iβ of the current vector converted to the α/β-coordinate system, it is executed to detect respective amplitudes Iα, Iβ by detecting their peaks of the components iα, iβ and also executed to detect the superimposed current phases φiα, φiβ by detecting their zero-cross periods of the components iα, iβ, as shown in FIG. 5.

At step S7, it is executed to calculate the initial angle θ within the zone of ±90 degrees provisionally. Noted that the calculation result at this time is represented by an angle $\theta_2$ while the calculation result at the previous routine is represented by an angle $\theta_1$.

At steps S8 to S10, it is executed to expand the initial angle θ within the zone of ±90 degrees to an angle within the zone of ±180 degrees. In order to expand this angle θ up to the zone of ±180 degrees, there is employed a premise that there is no change in phase exceeding 90 degrees in accordance with a continuous detection. That is, in accordance with the continuous detection, when a phase changes from 89 degrees to −89 degrees, it is assumed that the phase changes from 89 degrees to 91 degrees (=−89+180 degrees). Similarly, when a phase changes from −89 degrees to 89 degrees, it is assumed that the phase changes from −89 degrees to −91 degrees (=89+180−360 degrees). Consequently, it is possible to detect an angle θ within a zone of ±180 degrees. However noted that the initial phase at the first detection cannot be determined. In detail, if the calculation at the first detection results in 30 degrees, it is unclear whether the initial phase is 30 degrees or −150 degrees. Therefore, it is established at the first detection that the angle θ zones from −90 degrees to 90 degrees temporarily.

At step S8, it is judged whether the present calculation is the initial calculation or not. If the judgment at step S8 is Yes (the initial calculation), then the routine goes to step S11 to output the calculation result (value) as it is. On the other hand, if the judgment at step S8 is No (not the initial calculation), then the routine goes to step S9.

At step S9, it is judged whether the absolute value of a difference between the previous calculation value (angle) $\theta_1$ and the present calculation value (angle) $\theta_2$ is more than 90 degrees. If the judgment at step S9 is No (less than 90 degrees), then the routine goes to step S11 to output the present calculation value (angle) $\theta_2$ as a detected phase angle $\theta_0$. If the judgment at step S9 is Yes (more than 90 degrees), then the routine goes to step S11 to output a value obtained by adding 180 degrees to the present calculation value (angle) $\theta_2$ as a detected phase angle $\theta_0$.

The above-mentioned calculation (from step S6 to step S11) is performed by the d-axis detecting unit 18.

We now describe the correction of the phase angle by means of the characterizing amount as the feature of the present invention.

The correction of the phase angle at the d-axis detecting unit 18 and the characteristic-feature control unit 20 is carried out when the magnetic saturation arises (at high-load zone).

Figure 6:
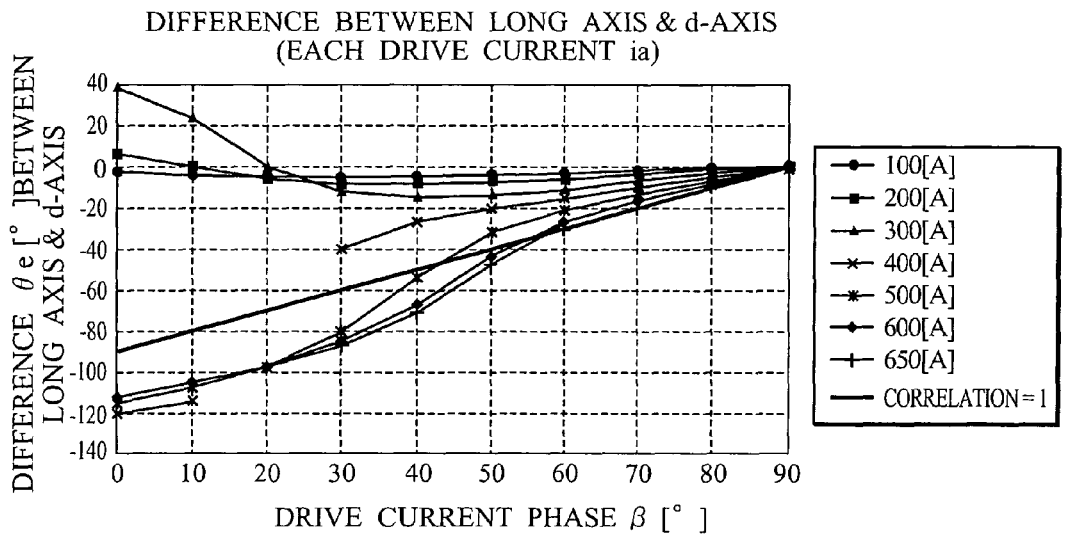
FIG. 6 is a diagram showing a difference $\theta e$ between a long axis of an ellipse and a d-axis at magnetic saturation in a current vector locus.

When the magnetic saturation arises, a difference $\theta_e$ between the long axis of an ellipse and the d-axis becomes as shown in FIG. 6. Here noted that a term "ellipse" means an ellipse (elliptic current) of the current vector locus shown in FIG. 3B. In FIG. 6, a longitudinal axis designates the difference $\theta_e$ between the long axis and the d-axis, a transverse axis β designates a phase angle (i.e. phase angle from the q-axis) of the drive current and sequential lines denote the characteristics of various drive currents $i_a = \sqrt{(i_d^2 + i_q^2)}$. When the drive current value is small, there is no change in a fact that the long axis of the ellipse substantially represents the d-axis in spite of a little error therebetween (the zone from about 100A to 300A in FIG. 6). While, when the drive current value is large, the long axis of the ellipse moves in accordance with the current phase angle, enhancing the correlation with the current phase angle apart from the correlation with the d-axis. In this situation, it is impossible to detect a current phase. Therefore, in case of magnetic saturation (at high load zone), the other characteristic feature obtained by an elliptic current is employed.

Figure 7:
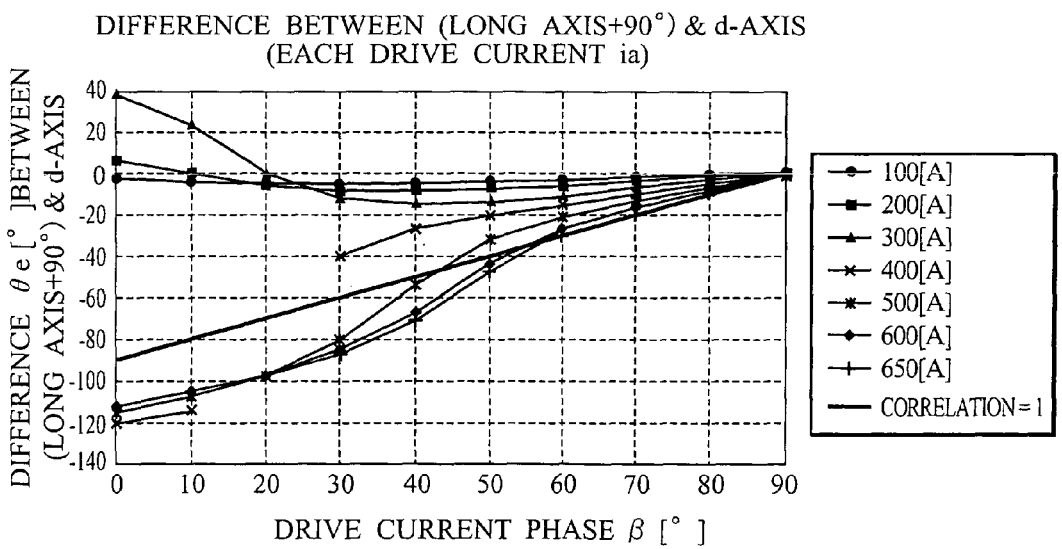
FIG. 7 is a diagram showing a difference $\theta e$ between a long axis of an ellipse and a d-axis at magnetic saturation in a voltage vector locus.
Figure 30B:
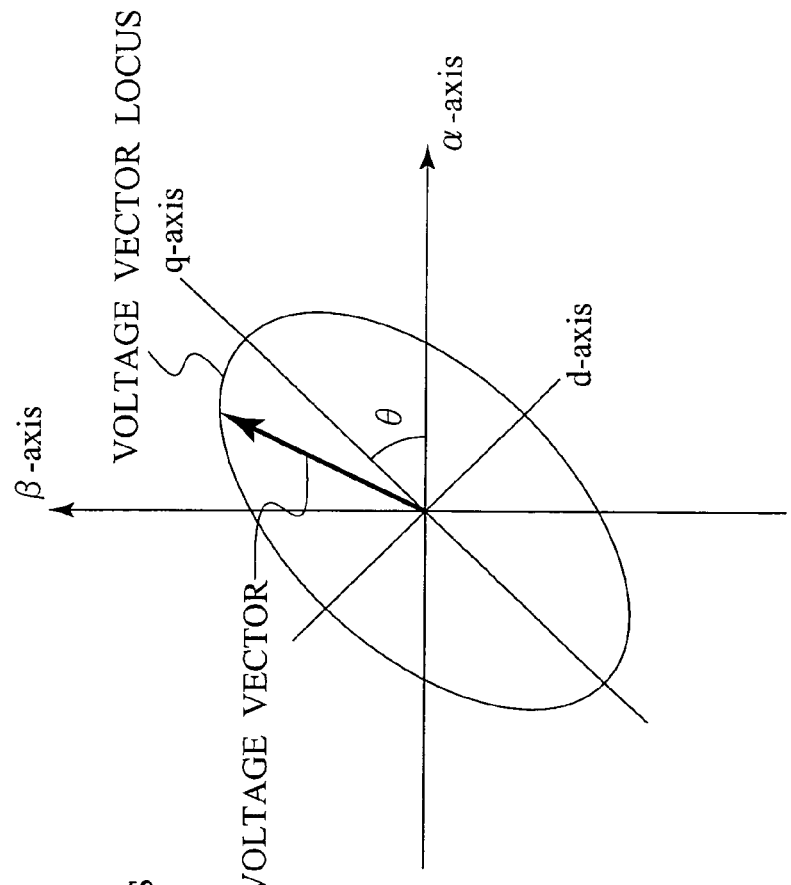
FIG. 30B is a diagram showing a voltage vector locus drawing an ellipse.

FIG. 7 shows the characteristics similar to that of FIG. 6, with respect to a voltage vector locus (shown in FIG. 30B). As shown in FIG. 30B, since the position of (the long axis+90 degrees) corresponds to the d-axis in the voltage vector locus (elliptic voltage), FIG. 7 exhibits the difference $\theta_e$ between (the long axis+90 degrees) and the d-axis.

Figure 8:
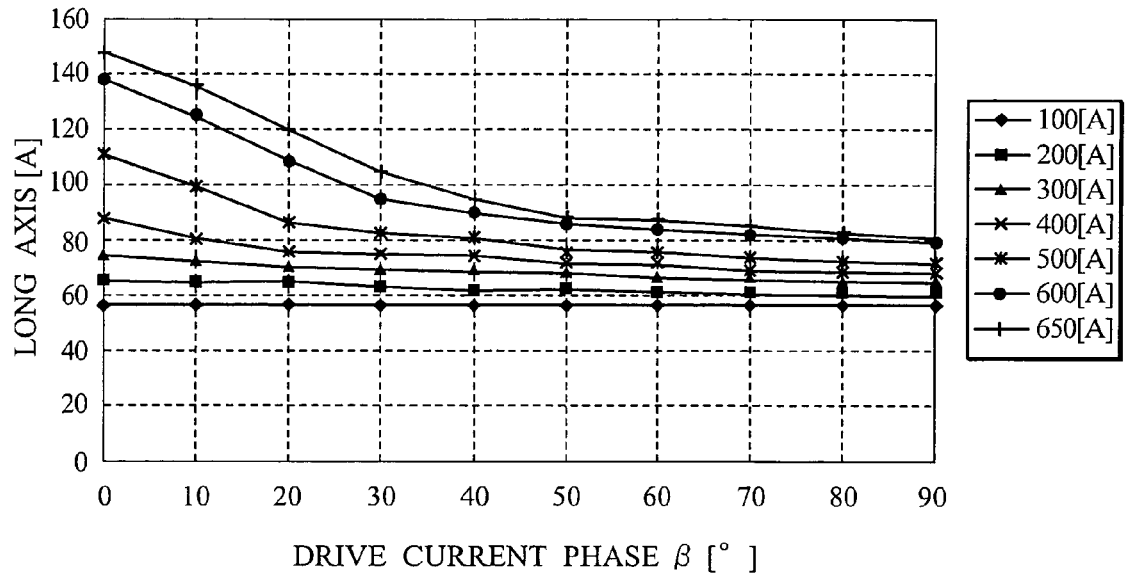
FIG. 8 is a diagram showing the relationship between the length (a) of a long axis of an elliptic current as a characteristic feature and the current phase $\beta$.
Figure 9:
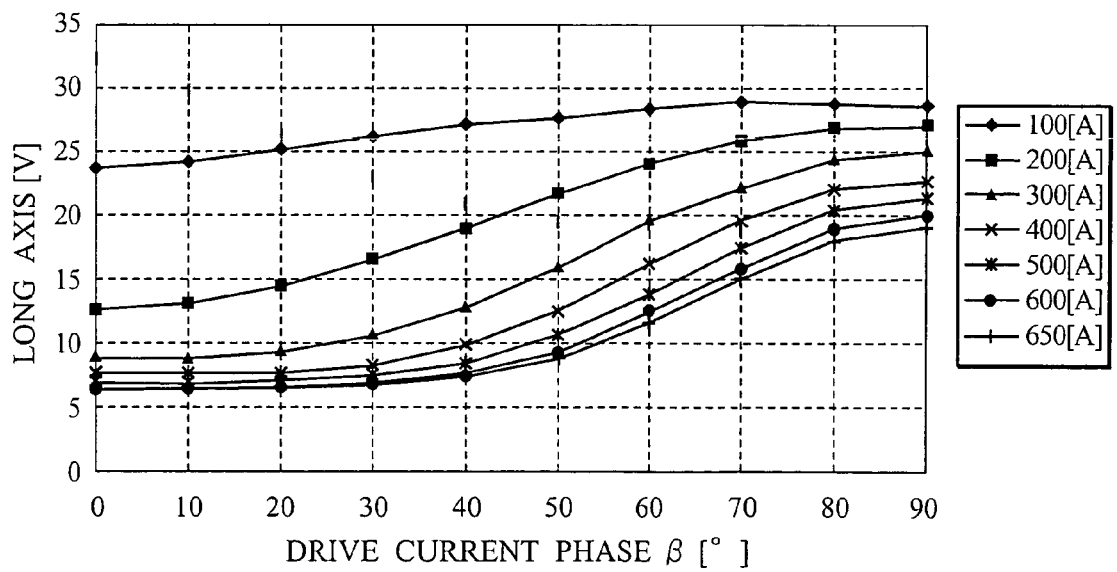
FIG. 9 is a diagram showing the relationship between the length (a) of a long axis of an elliptic current as a characteristic feature and the current phase $\beta$.
Figure 10:
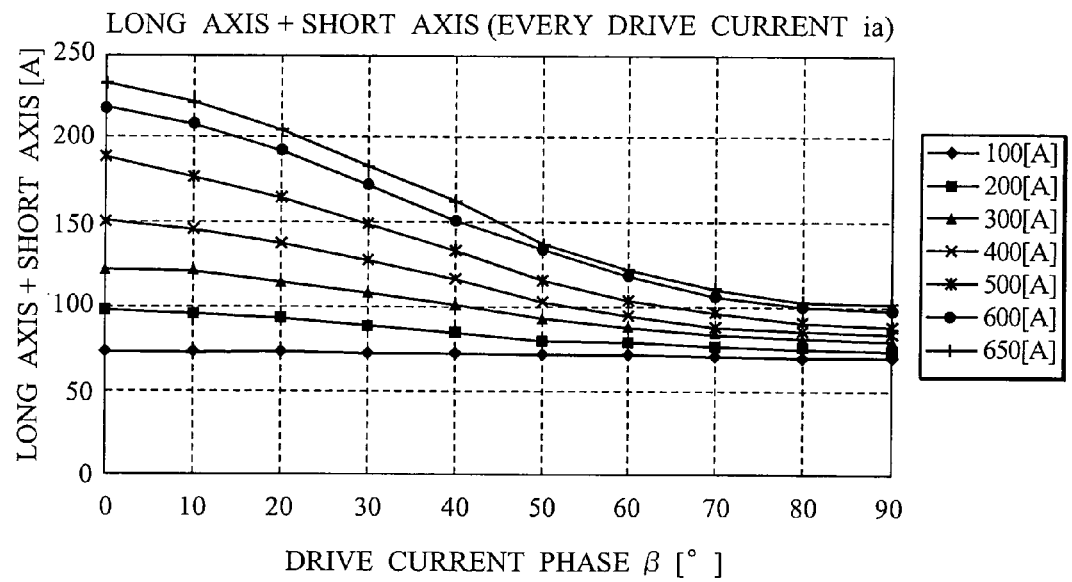
FIG. 10 is a diagram showing the relationship between the length (a) of a long axis+the length (b) of a short axis of an elliptic current as a characteristic feature and the current phase $\beta$.
Figure 11:
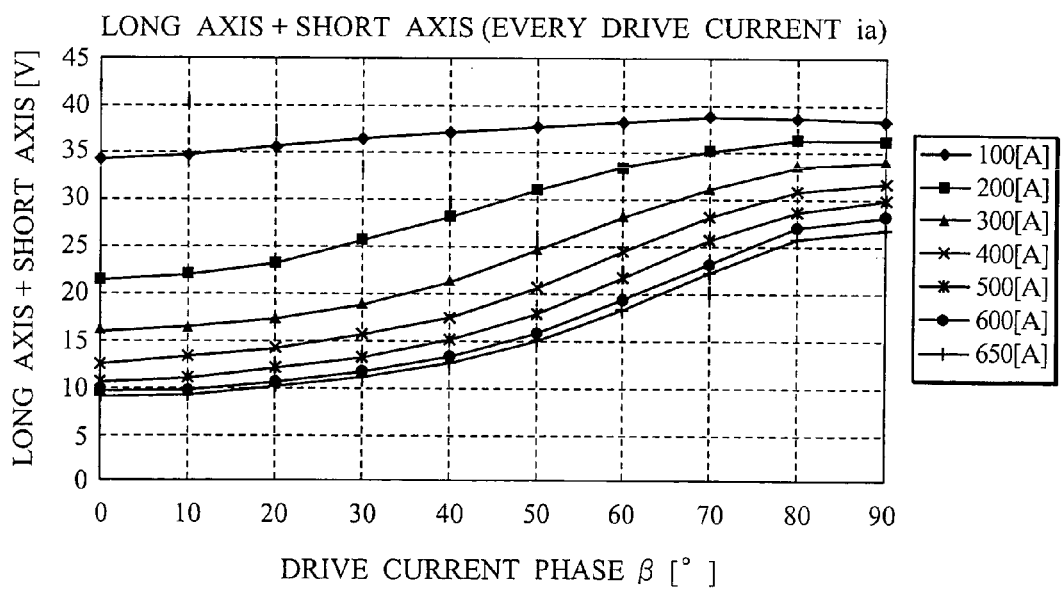
FIG. 11 is a diagram showing the relationship between the length (a) of a long axis+the length (b) of a short axis of an elliptic voltage as a characteristic feature and the current phase $\beta$.
Figure 12:
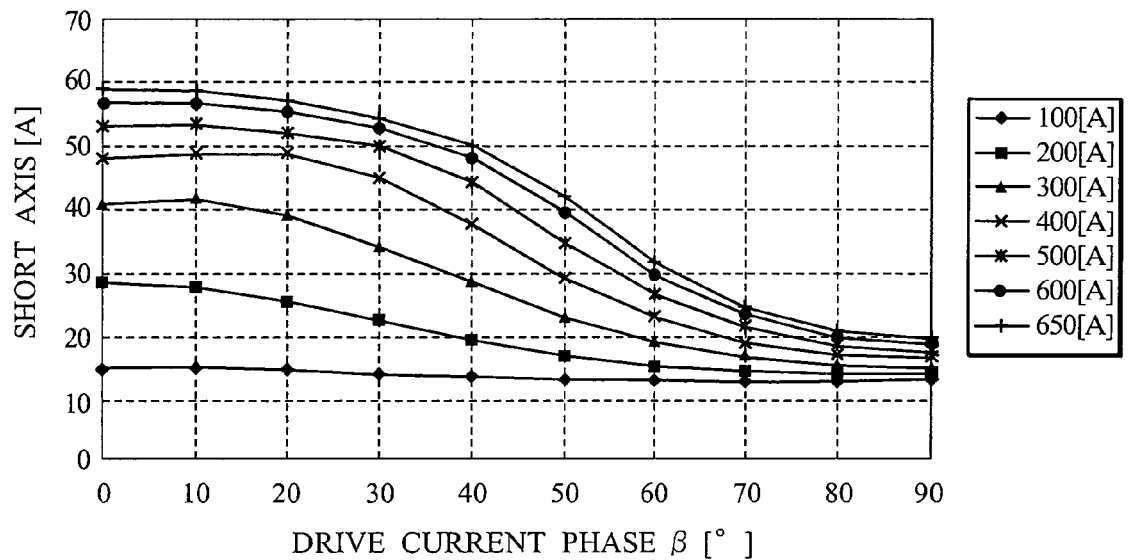
FIG. 12 is a diagram showing the relationship between the length (b) of a short axis of an elliptic current as a characteristic feature and the current phase $\beta$.
Figure 13:
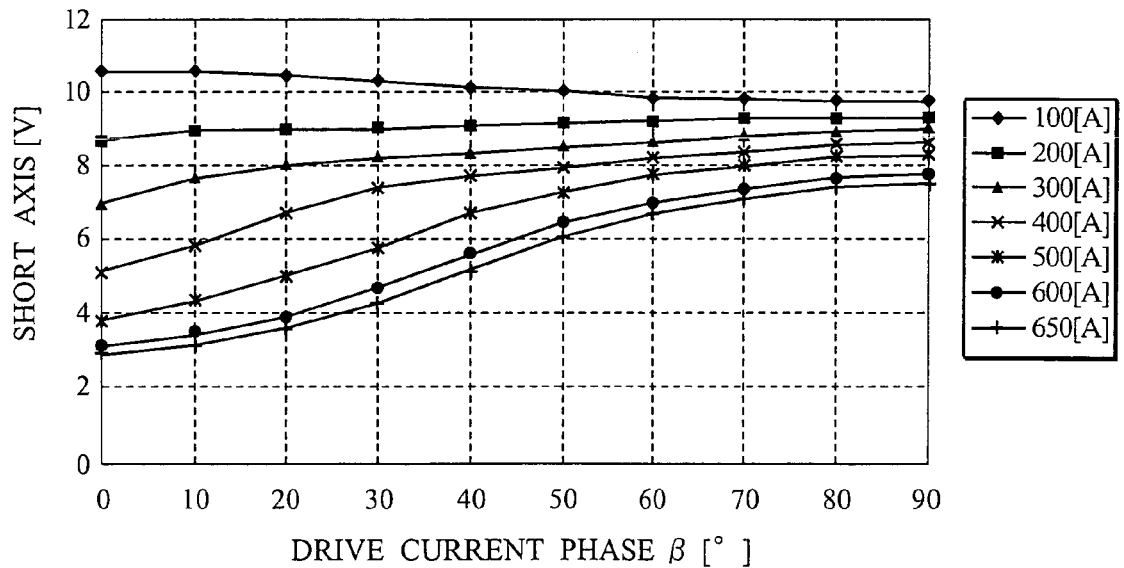
FIG. 13 is a diagram showing the relationship between the length (a) of a short axis of an elliptic voltage as a characteristic feature and the current phase $\beta$.
Figure 14:
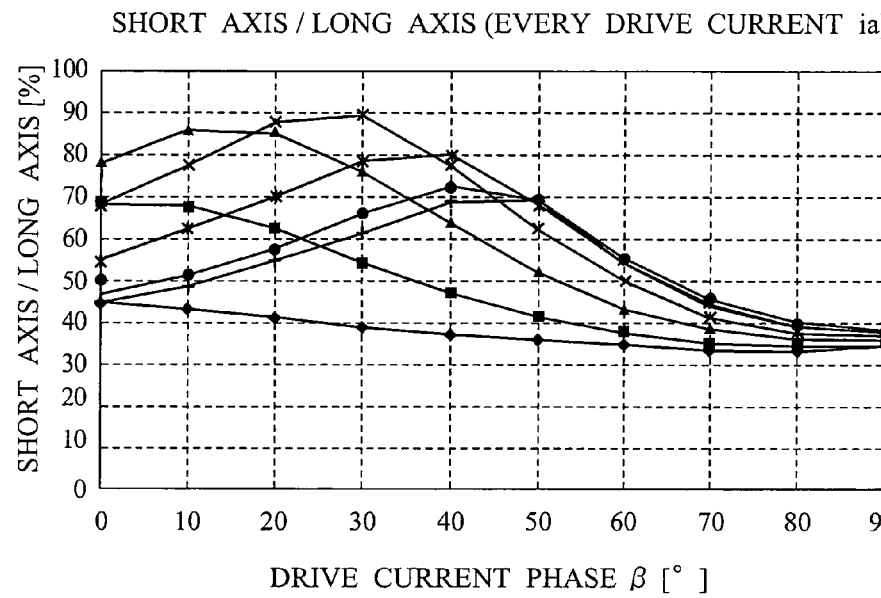
FIG. 14 is a diagram showing the relationship between the length (b) of a short axis/the length (a) of a long axis of an elliptic current as a characteristic feature and the current phase $\beta$.
Figure 15:
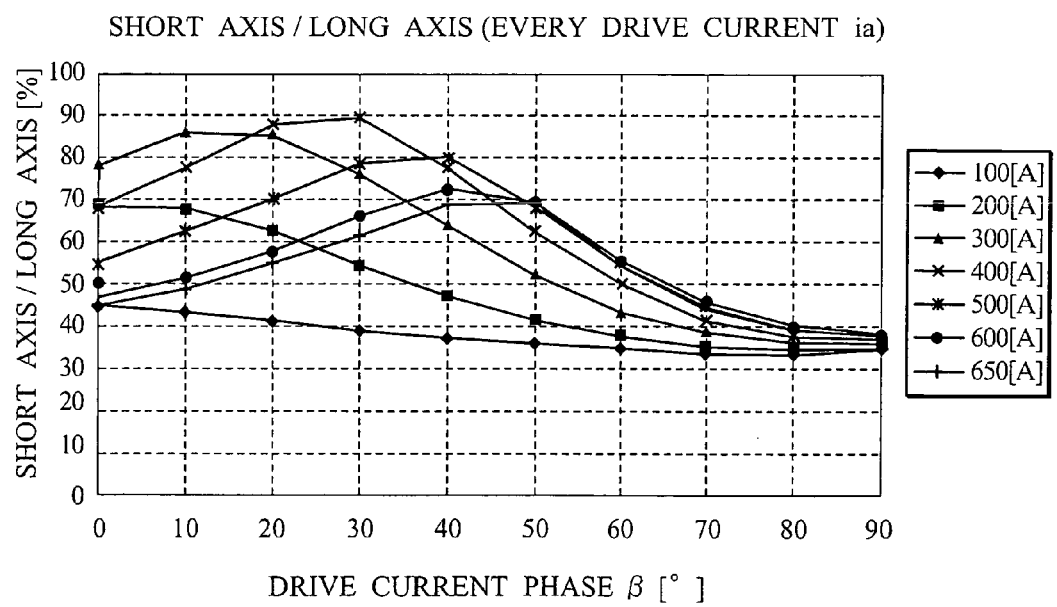
FIG. 15 is a diagram showing the relationship between the length (b) of a short axis/the length (a) of a long axis of an elliptic voltage as a characteristic feature and the current phase $\beta$.
Figure 20:
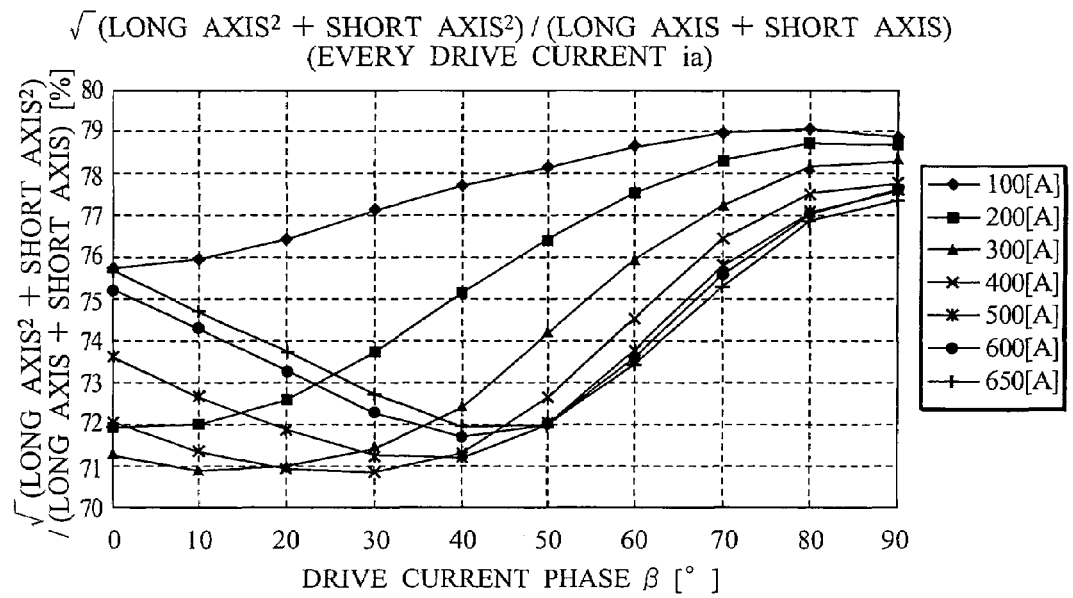
FIG. 20 is a diagram regarding the length (a) of a long axis and the length (b) of a short axis of an elliptic current as a characteristic feature, showing the relationship between $\sqrt{(a^2+b^2)(a+b)}$ and the current phase $\beta$.
Figure 21:
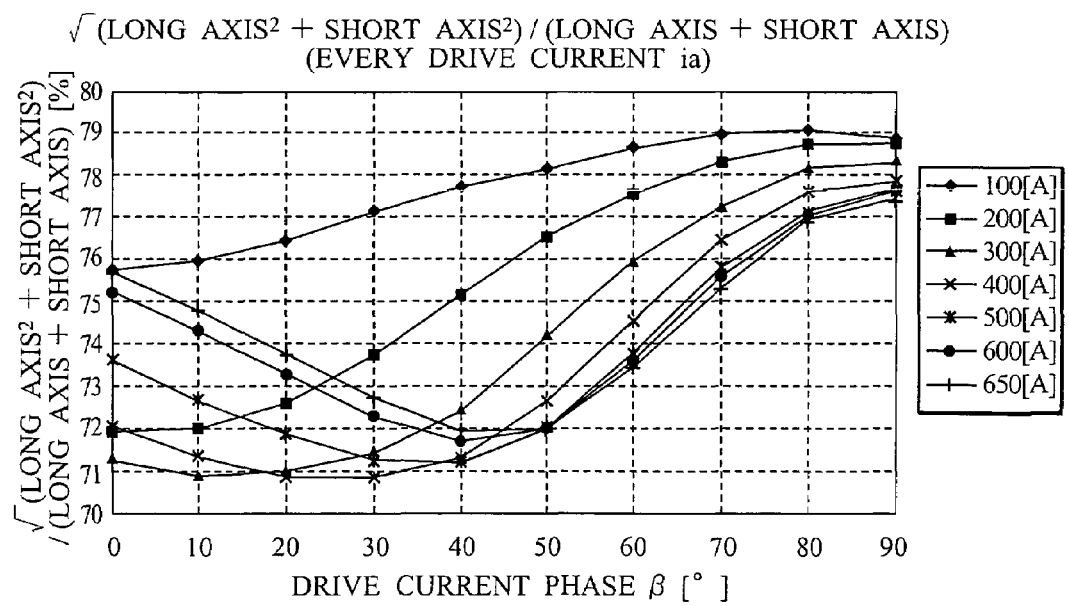
FIG. 21 is a diagram regarding the length (a) of a long axis and the length (b) of a short axis of an elliptic voltage as a characteristic feature, showing the relationship between $\sqrt{(a^2+b^2)(a+b)}$ and the current phase $\beta$.

FIGS. 8, 10, 12, 14, 16, 18 and 20 are views showing the relationships between various characteristic features and the drive current phase angle β under the similar condition as that of FIG. 6. In these figures, FIG. 8 shows the characteristic feature of the length a of the long axis in an elliptic current, FIG. 10 the characteristic feature of the total length of (a+b), FIG. 12 the characteristic feature of the length b of the short axis, FIG. 14 the characteristic feature of the calculation of (b/a), FIG. 16 the characteristic feature of the calculation of (a×b), FIG. 18 the characteristic feature of the calculation of $\sqrt{(a^2+b^2)}$, and FIG. 20 shows the characteristic feature of the calculation of $\sqrt{(a^2+b^2)} \div (a+b)$. Similarly, FIGS. 9, 11, 13, 15, 17, 19 and 21 are views showing the relationships between various characteristic features and the drive current phase angle β under the similar condition as that of FIG. 7. In these figures, FIG. 9 shows the characteristic feature of the length a of the long axis in an elliptic voltage, FIG. 11 the characteristic feature of the total length of (a+b), FIG. 13 the characteristic feature of the length b of the short axis of an elliptic voltage, FIG. 15 the characteristic feature of the calculation (b/a), FIG. 17 the characteristic feature of the calculation (a×b), FIG. 19 the characteristic feature of the calculation of $\sqrt{(a^2+b^2)}$, and FIG. 21 shows the characteristic feature of the calculation of $\sqrt{(a^2+b^2)} \div (a+b)$. Note, embodiments adopting the above voltage vector locus will be described in FIG. 29, thereinafter.

The above characteristic-feature control unit 20 is provided to control these characteristic features to respective predetermined values, i.e. respective targets determined at the current/characteristic feature target generating unit 10. In the characteristic-feature control unit 20, a correction angle θ' for phase is calculated to correct a d-axis phase angle $\theta_0$ by means of PI control etc.

In accordance with the properties of FIGS. 8, 10, 12, 14, 16, 18 and 20, the characteristic features have downward-sloping features as the drive current phase angle β increases. Therefore, if an actual characteristic feature is larger than its target value, the detection phase is advanced (increasing of the correction angle θ') so as to advance the rotating coordinate system while fixing the drive current phase angle β at a constant, thereby producing an effect to put the current phase angle β forwardly. While, if an actual characteristic feature is smaller than its target value, the detection phase is delayed (decreasing of the correction angle θ') so as to retard the rotating coordinate system while fixing the drive current phase angle β at a constant, thereby producing an effect to put the current phase angle β backwardly. Then, the control gains are determined by way of experiments. Note, as the feature of FIG. 20 (regarding the characteristic feature of the calculation of $\sqrt{(a^2+b^2)} \div (a+b)$), if a characteristic feature has a feature of upward-sloping as the drive current phase angle β increases, the above-mentioned relationship between advance and delay is reversed.

However, the correction by the correction angle θ' is carried out only in such a high load zone as to cause the magnetic saturation. In other words, the switch SW1 is turned ON when the drive current for the IPM motor 3 is more than a predetermined value, and also turned OFF when the drive current is less than the predetermined value.

Although there are supposed length of long axis (a), length of short axis (b), a+b, $\sqrt{(a^2+b^2)}$, etc. as the characteristic features obtained by the magnitude of an elliptic current, the using of characteristic features (e.g. b/a, $\sqrt{(a^2+b^2)}\div(a+b)$, etc.) with no unit (i.e. ratio) enables more precise control.

In adopting the characteristic feature of the calculation (b/a), it is possible to prevent an elliptic current from being of a perfect circle. While, in case of adopting the other characteristic features, their target values have to be established in order to prevent a circular elliptic current.

Figure 16:
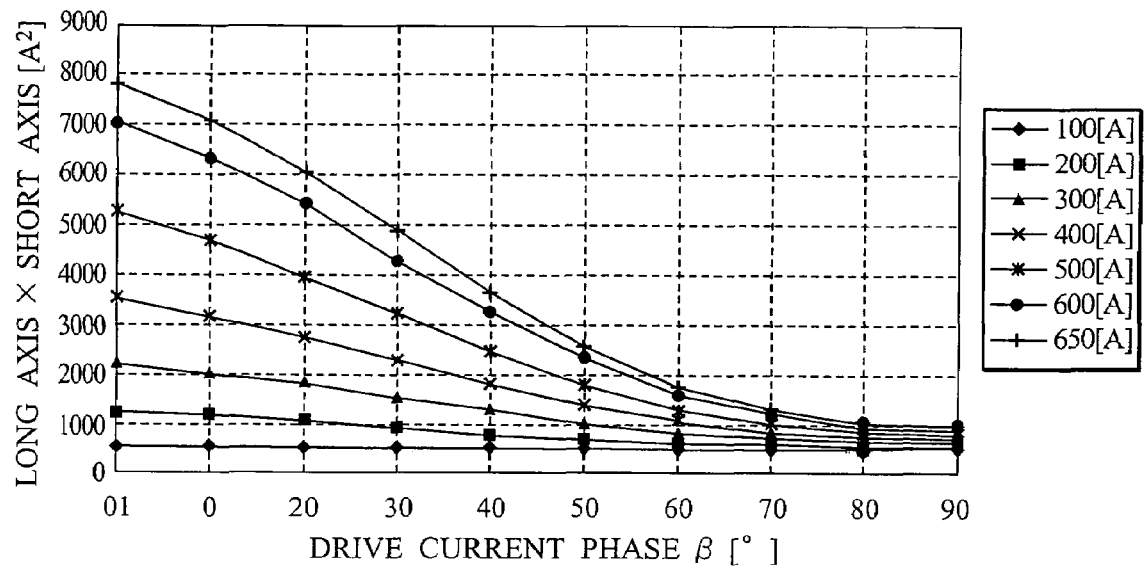
FIG. 16 is a diagram showing the relationship between the length (a) of a long axis×the length (b) of a short axis of an elliptic current as a characteristic feature and the current phase $\beta$.
Figure 17:
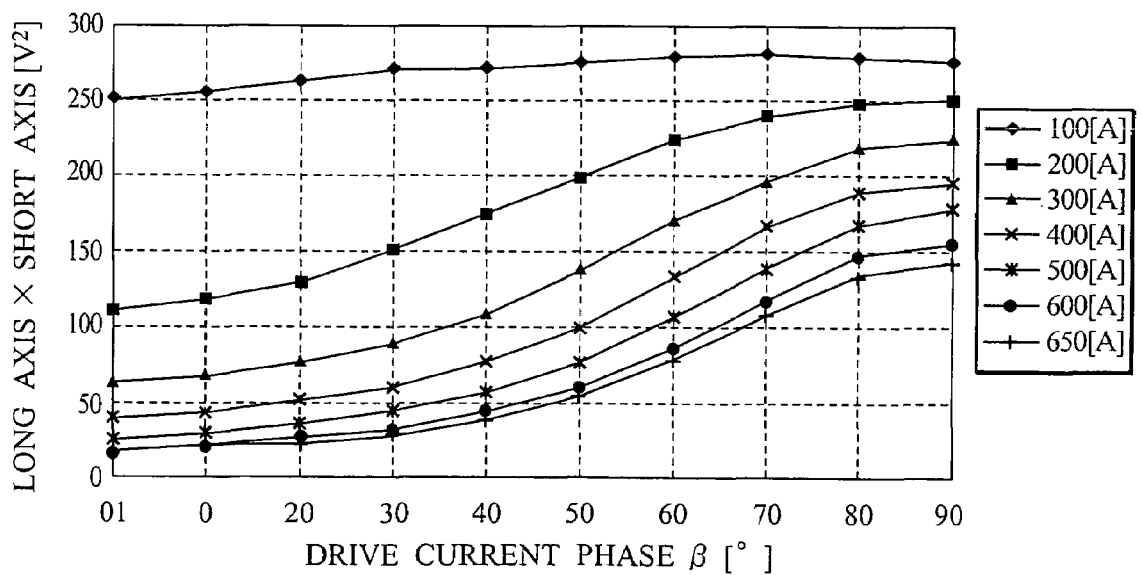
FIG. 17 is a diagram showing the relationship between the length (a) of a long axis×the length (b) of a short axis of an elliptic voltage as a characteristic feature and the current phase $\beta$.
Figure 18:
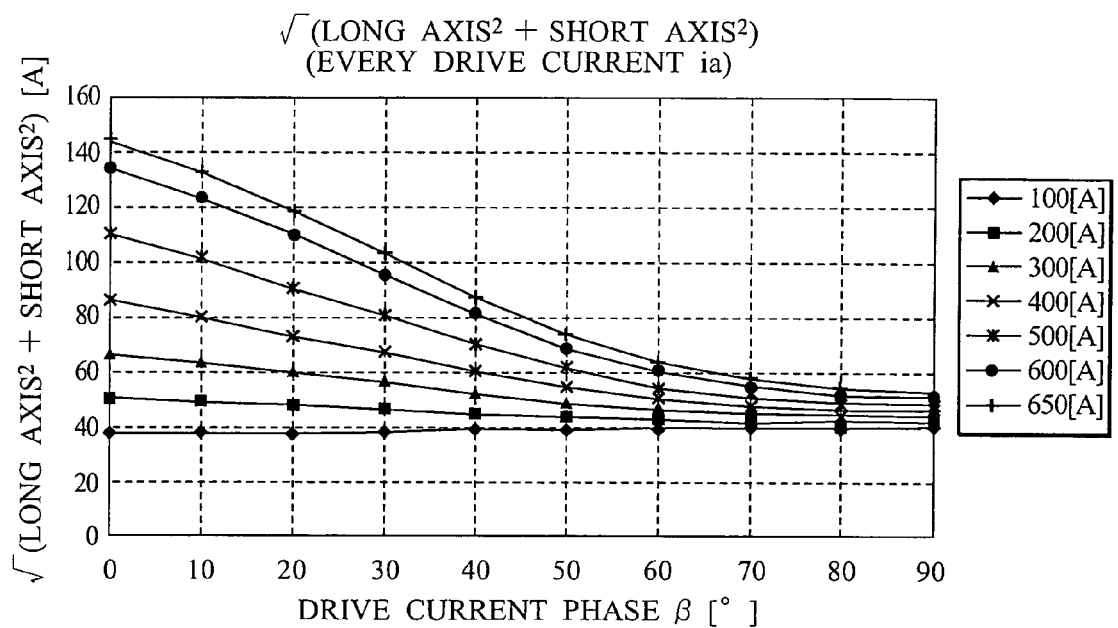
FIG. 18 is a diagram regarding the length (a) of a long axis and the length (b) of a short axis of an elliptic current as a characteristic feature, showing the relationship between $\sqrt{(a^2+b^2)}$ and the current phase $\beta$.
Figure 19:
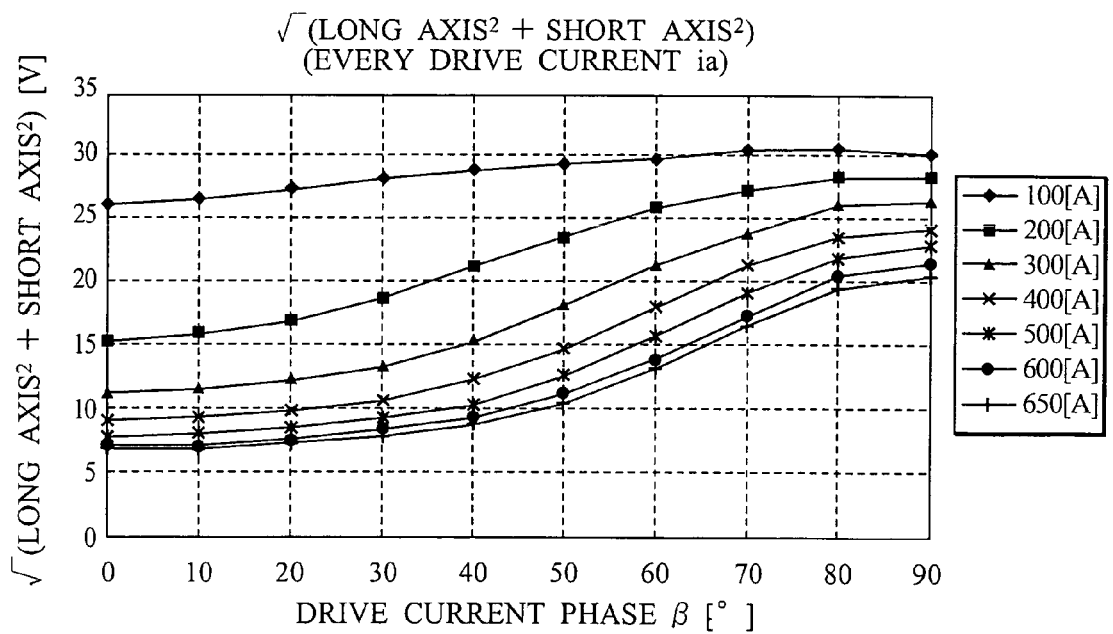
FIG. 19 is a diagram regarding the length (a) of a long axis and the length (b) of a short axis of an elliptic voltage as a characteristic feature, showing the relationship between $\sqrt{(a^2+b^2)}$ and the current phase $\beta$.

In case of the characteristic feature of (a×b), as shown in FIG. 16, since the current phase angle at a maximum torque zones from 30 to 50 degrees approximately, the inclinations for every currents are so linear as to facilitate the control of the characteristic feature in spite of the presence of minor differences in inclination. This characteristic feature is applicable to the characteristic features of a+b and $\sqrt{(a^2+b^2)}$, as well. However, as the characteristic feature depends on the motor, not all motor exhibits preferable characteristic feature. Noted, in case of the characteristic feature of (a×b), it has an advantage of reducing the calculation load because of no calculation of the square root ($\sqrt{\ }$).

The above-mentioned characteristic features are obtained by the following expressions. Thus, providing that alphabet (a) represents the length of a long axis of an ellipse and alphabet (b) represents the length of a short axis of the ellipse, both of the lengths (a) and (b) are calculated by the following expression (3).

$$a = \frac{1}{2}[\sqrt{\{I_\alpha^2 + I_\beta^2 + 2I_\alpha I_\beta |\sin(\psi_{i\alpha} - \psi_{i\beta})|\}} + \sqrt{\{I_\alpha^2 + I_\beta^2 - 2I_\alpha I_\beta |\sin(\psi_{i\alpha} - \psi_{i\beta})|\}}]$$

$$b = \frac{1}{2}[\sqrt{\{I_\alpha^2 + I_\beta^2 + 2I_\alpha I_\beta |\sin(\psi_{i\alpha} - \psi_{i\beta})|\}} - \sqrt{\{I_\alpha^2 + I_\beta^2 - 2I_\alpha I_\beta |\sin(\psi_{i\alpha} - \psi_{i\beta})|\}}]$$

(3)

As the target value, the current/characteristic feature target generating unit 10 includes the characteristic features obtained by way of experiments in advance, in the form of a table for every torque. Similarly to the target values in current, the same unit 10 searches and calculates the characteristic feature corresponding to the target value in torque. Besides, since the actual current is different from the target value in current, it is desirable to apply a low-pass filter considering the responsibility in current control to the target value for the characteristic feature. Alternatively, the unit 10 may be adapted so as to calculate a target value for the characteristic feature from an actual current while using a table for every current instead of the above table for every torque.

Now, we provide respective expressions for the above-mentioned calculations, together.

$$\begin{pmatrix} id \\ iq \end{pmatrix} = \begin{pmatrix} \cos\theta & \sin\theta \\ -\sin\theta & \cos\theta \end{pmatrix} \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} i_u \\ i_v \\ i_w \end{pmatrix}$$

(4)

$i_d$, $i_q$: discrete values of d-axis and q-axis currents [A]
$i_u$, $i_v$, $i_w$: discrete values of three-phase currents [A]

(note: the member "$i_w$" may be omissible on the relationship of "$i_w = -i_u - i_v$")
θ: phase generated from the d-axis detection unit $$v^*_d(s) = (K_{pd} + K_{id}/s)\{i^*_d(s) - i_d(s)\}$$

$$v^*_q(s) = (K_{pq} + K_{iq}/s)\{i^*_q(s) - i_q(s)\}$$

(5)

$i^*_d$, $i^*_q$: command values of d-axis and q-axis currents [A]
$v^*_d$, $v^*_q$: command values of d-axis and q-axis voltages [V]
s: Laplace operator
$K_{pd}$, $K_{pq}$: proportional gains of d-axis and q-axis
$K_{id}$, $K_{iq}$: integral gains of d-axis and q-axis $$v^*_d = v'^*_d - \omega L_q i_q$$

$$v^*_q = v'^*_q + \omega(L_d i_d + \Phi)$$

(6)

$v^*_d$, $v^*_q$: command values of d-axis and q-axis voltages [V]
$v'^*_d$, $v'^*_q$: command values of d-axis and q-axis voltages as PI control outputs [V]
$i_d$, $i_q$: values of d-axis and q-axis currents [A]
$L_d$, $L_q$: inductance of d-axis and q-axis currents [H]
Φ: induced voltage constant [Wb]
ω: angular speed (electrical degree) [rad/s]

$$\begin{pmatrix} v^*_u \\ v^*_v \\ v^*_w \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} \cos\theta & -\sin\theta \\ \sin\theta & \cos\theta \end{pmatrix} \begin{pmatrix} v^*_d \\ v^*_q \end{pmatrix}$$

(7)

$v^*_u$, $v^*_v$, $v^*_w$: command values of three-phase voltages [V]

$$t^*_u = \frac{T_0}{2} \frac{v^*_u}{v_{dc}}, \quad t^*_v = \frac{T_0}{2} \frac{v^*_v}{v_{dc}}, \quad t^*_w = \frac{T_0}{2} \frac{v^*_w}{v_{dc}}$$

(8)

$v_{dc}$: discrete value of DC voltage [V]
$t^*_u$, $t^*_v$, $t^*_w$: three-phase PWM duty widths (ON-period for upper arm)
$T_0$: PWM cycle (e.g. 100 [μs] at 10 [kHz])

$$a+b = \sqrt{\{I_\alpha^2 + I_\beta^2 + 2I_\alpha I_\beta |\sin(\psi_{i\alpha} - \psi_{i\beta})|\}}$$ (9)

$$\sqrt{(a^2+b^2)} = \sqrt{(I_\alpha^2 + I_\beta^2)}$$ (10)

$$ab = I_\alpha I_\beta |\sin(\psi_{i\alpha} - \psi_{i\beta})|$$ (11)

As mentioned above, according to the first embodiment of the invention, since the phase angle is corrected by the characteristic feature based on at least one of the length of a long axis and the length of a short axis of a current vector locus, it is possible to detect the phase angle without any sensor even when the motor is driven within a high load zone causing magnetic saturation.

In addition, it is also possible to absorb a delay in detecting the phase due to a change in rotating speed of the motor.

In case of employing the product (a×b) as the characteristic feature, it has advantages of improving the characteristic feature in the vicinity (about 30 to 60 degrees) of current phase angle for generating the maximum torque as similar to the other characteristic features (a+b, $\sqrt{(a^2+b^2)}$) and reducing the calculation load.

Figure 22:
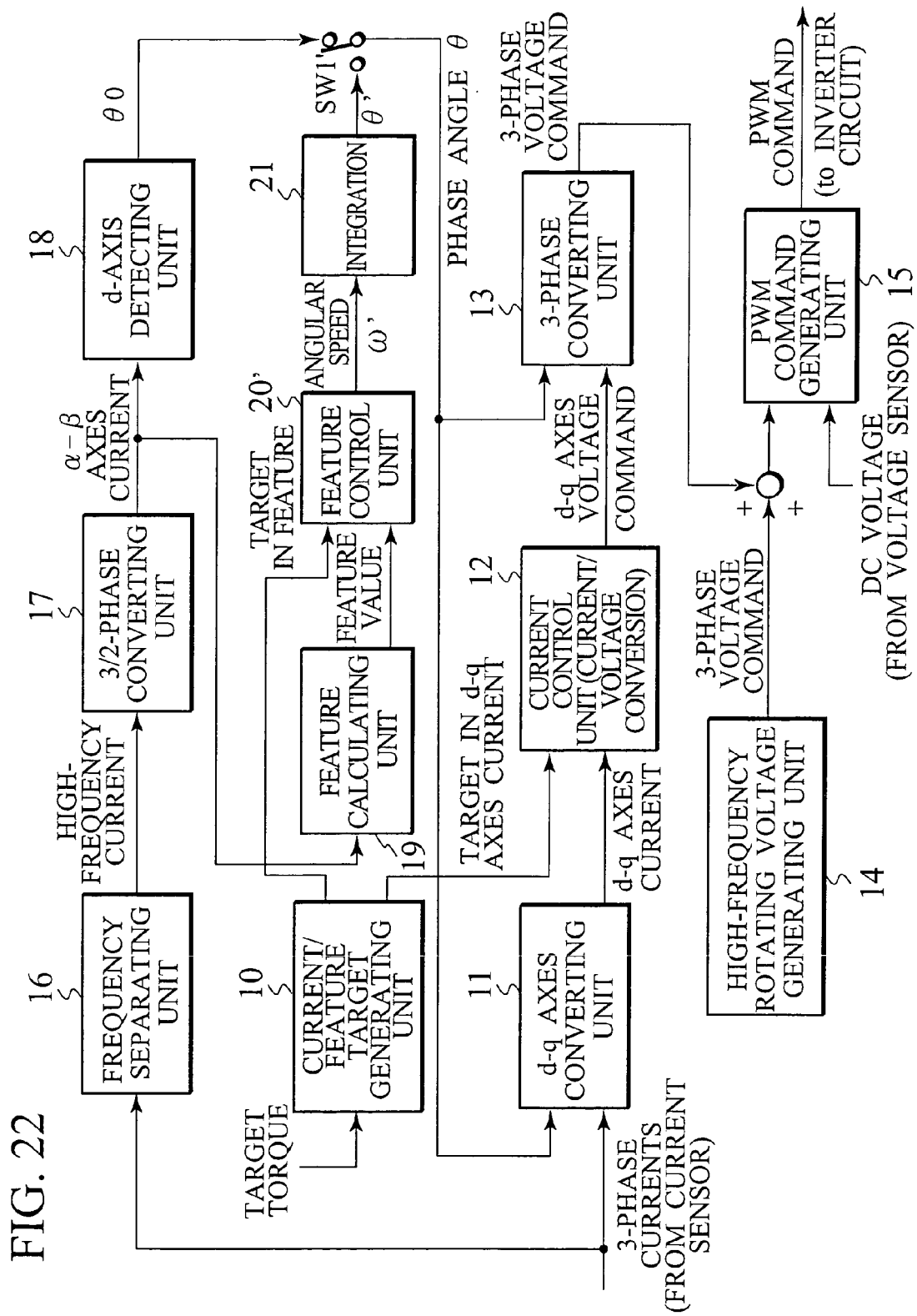
FIG. 22 is a block diagram showing the details of the control device of FIG. 1, in accordance with the second embodiment of the present invention.

Next, FIG. 22 is a block diagram, showing the details of the control device 1 of FIG. 1, in accordance with the second embodiment of the invention.

In this embodiment, when the motor is driven in a high load zone causing the magnetic saturation, only the characteristic-feature control unit 20' detects a phase of the motor, while a d-axis phase angle $\theta_0$ from the d-axis detecting unit 18 is not used.

In this case, the characteristic-feature control unit 20' outputs an angular speed ω'[rad/s]. Then, the angular speed ω' is integrated to calculate a phase angle θ' [rad] by an integrating circuit 21. That is, the characteristic-feature control unit 20' calculates an angular speed ω'[rad/s] and corrects a phase angle by means of PI control method etc. Since the characteristic quantity has a feature of downward inclination to the right due to the current phase β, if an actual characteristic feature is larger than its target value, the detection phase is advanced (increasing of the angular speed ω') so as to advance the rotating coordinate system while fixing the at a constant, thereby producing an effect to advance the drive current phase angle β. While, if an actual characteristic feature is smaller than its target value, the detection phase is delayed (decreasing of the angular speed ω') so as to retard the rotating coordinate system while fixing the at a constant, thereby producing an effect to delay the drive current phase angle β. Then, the control gains are determined by way of experiments.

The calculation of the angular speed ω' is carried out by using the following expression (12), for example. On the other hand, as the feature of FIG. 20 (i.e. the characteristic feature of the calculation $\sqrt{(a^2+b^2)} \div (a+b)$), if a characteristic feature has a feature of upward-sloping as the drive current phase angle β increases, the angular speed ω' is obtained by the expression (12').

$$\omega(s) = -\left(K_p + \frac{K_i}{s}\right)\{ft^*(s) - ft(s)\} \quad (12)$$

ω: angular speed (electrical angle) [rad/s]
ft*: target value in characteristic feature
ft: characteristic feature
$K_p$: proportional gain
$K_i$: integral gain
s: Laplace operator $$\omega(s) = \left(K_p + \frac{K_i}{s}\right)\{ft^*(s) - ft(s)\} \quad (12')$$

In this case, the relationship between the magnitudes of the actual characteristic feature/feature target value and the increase/decrease of the angular speed ω is opposite to that of the case of having a feature of downward-sloping.

With the exception of high load zone causing magnetic saturation, the switch SW1' is connected with the d-axis detecting unit 18 to transmit a d-axis phase angle $\theta_0$ to the following circuit, in the form of a phase angle θ. In the high load zone causing magnetic saturation, the switch SW1 is connected to the integrating circuit 21 to transmit a value as a result of integrating an angular speed ω' to the following circuit, in the form of a phase angle θ'.

The constitution of FIG. 22 has an advantage of eliminating attention that an elliptic current might be a perfect circle.

Figure 23:
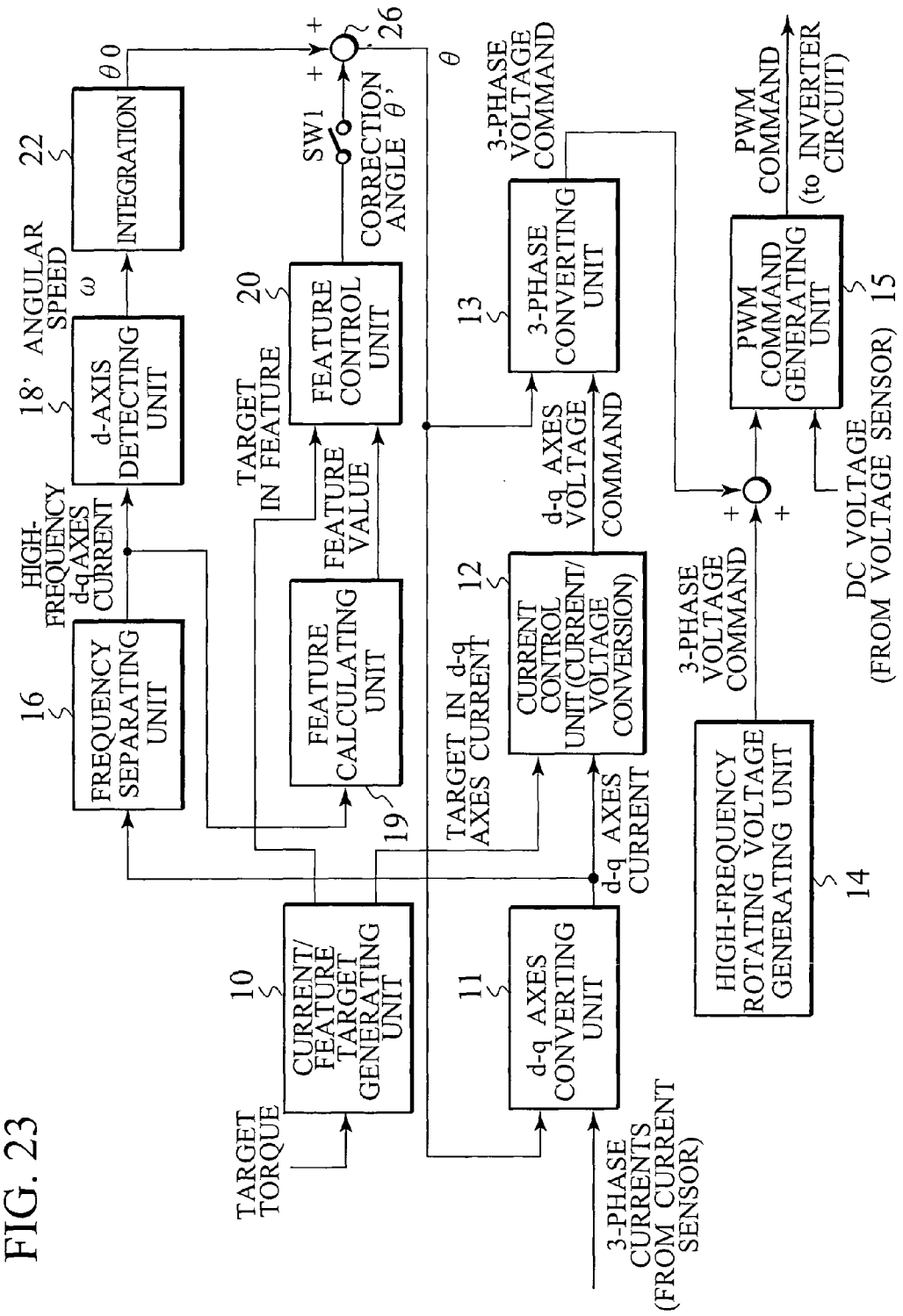
FIG. 23 is a block diagram showing the details of the control device of FIG. 1, in accordance with the third embodiment of the present invention.

FIG. 23 is a block diagram, showing the details of the control device 1 of FIG. 1, in accordance with the third embodiment of the invention.

In this embodiment, an angular speed ω is employed in the calculation of a d-axis phase angle $\theta_0$ at the d-axis detecting unit 18.

In FIG. 23, the frequency separating unit 16 inputs a d-axis current and a q-axis current after conversion by the d-axis/q-axis converting unit 11 and further separates high-frequency components (high-frequency d-axis/q-axis currents) from the above currents.

At the d-axis detecting unit 18', both amplitude and phase of the current vector are determined by detecting respective peak values and zero-cross periods of the d-axis component id and the q-axis component iq of the current vector (after separating high-frequency components) converted onto the d/q-axes. Although an angle θ between the d-axis and the long axis of an ellipse is similar to that of the above expression (1) expect to alter the members of Iα, Iβ, φiα and φiβ to the members of Id, Iq, φid and φiq respectively, it is executed to multiply the angle θ by a regular coefficient (i.e. proportional calculation) thereby outputting an angular speed ω. Then, in the integrating circuit 22, the angular speed ω is integrated to generate a d-axis phase angle $\theta_0$ for output.

As mentioned above, the angular speed ω may be provided by the proportional calculation while establishing the angle θ from the d-axis to the long axis of an ellipse, of zero. Alternatively, the angular speed ω may be provided by a PI (proportional integrating) calculation. Or again, providing that the unit 18' includes map-tables with every torque each defining the relationship between a torque detected by an experiment in advance and the corresponding angle θ from the d-axis to the long axis of an ellipse, if the unit 18' is adapted so as to determine the angle θ corresponding to a target torque by means of the specified map-table, then it is possible to improve the accuracy of an estimated phase.

The characteristic-feature control unit 20 outputs a correction angle θ', as similar to FIG. 2. In a high-load zone where the switch SW1 is turned ON, the characteristic-feature control unit 20 corrects the d-axis phase angle $\theta_0$ by the correction angle θ' to provide a phase angle θ, as similar to FIG. 2.

The detection of the long axis on the d/q-axes, which is embodied by the arrangement of FIG. 23, has an advantage of eliminating detection errors since the locus of a high-frequency current vector comes to a standstill while drawing an ellipse on the d/q-axes at regular revolutions of the motor.

Figure 24:
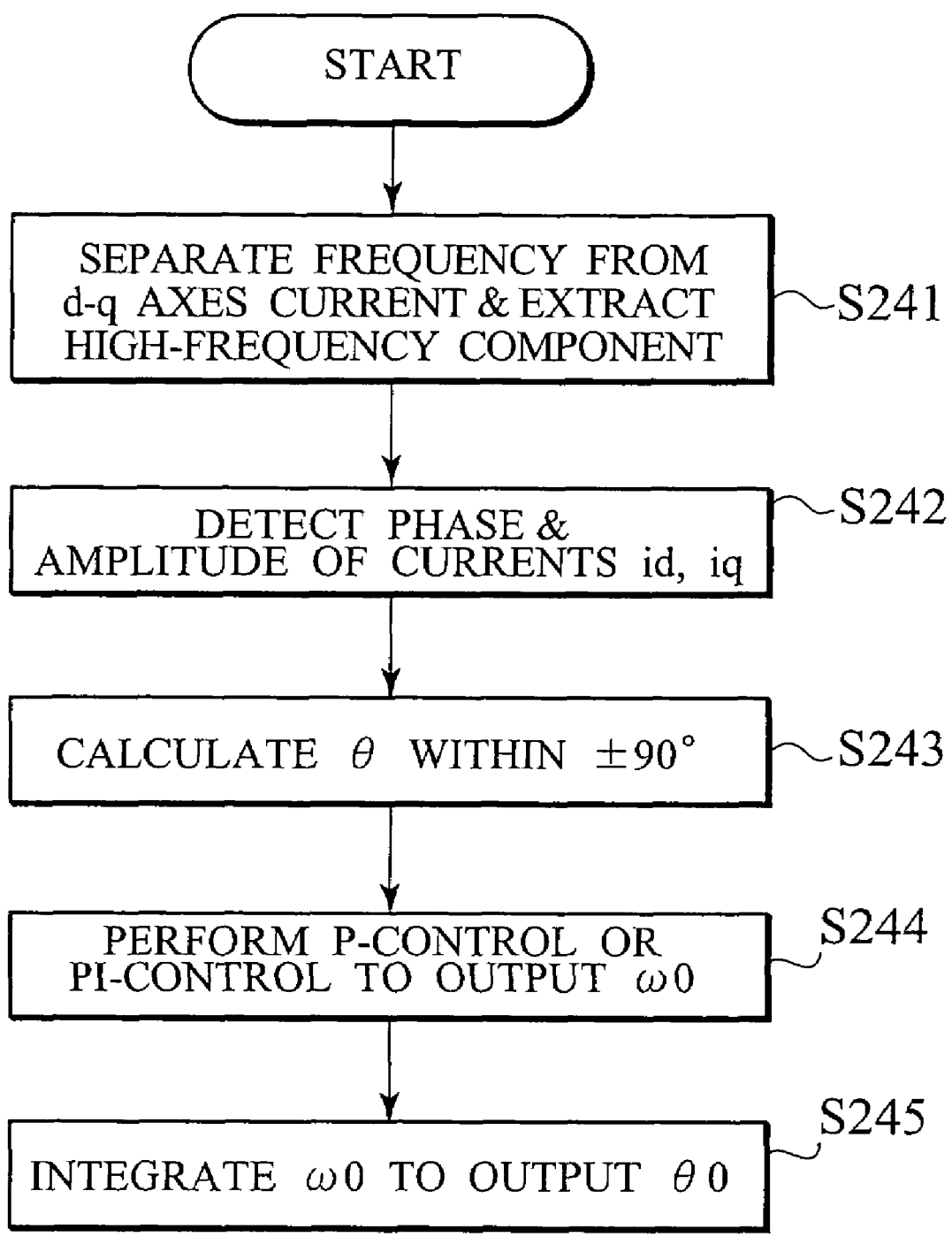
FIG. 24 is a flow chart of the process to start the torque control in case of no magnetic saturation (except a high load zone) in the third embodiment.

FIG. 24 is a flow chart of the process to start the torque control in case of no magnetic saturation (out of a high load zone), corresponding to the operation of FIG. 4B. Note, the operation shown in FIG. 24 follows the operation shown in FIG. 4A.

Figure 25:
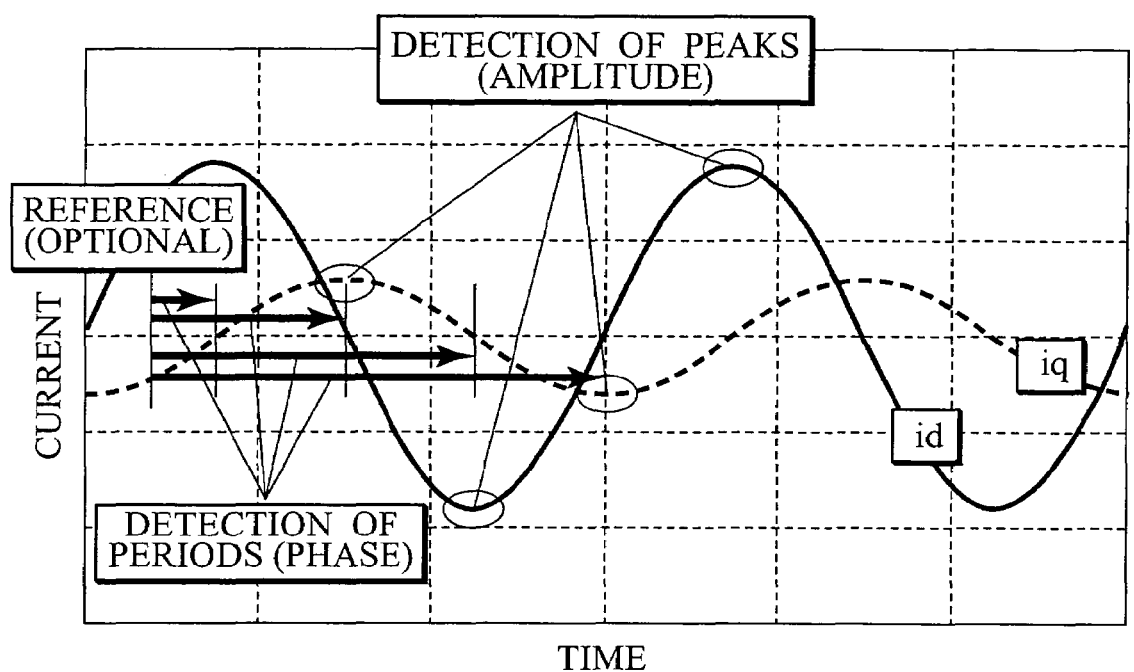
FIG. 25 is a diagram to explain a method of detecting phases $\phi i\alpha$ and $\phi i\beta$ in the third embodiment.

In the flow chart of FIG. 24, at step S241, a current detected by the current sensor 4 is converted onto the d/q-axes by the d-axis/q-axis converting unit 11 and thereafter, the high-frequency component is separated from the current (frequency separating unit 16) thereby to establish a state as shown in FIG. 3B. At sequent step S242, as for the d-axis component id and the q-axis component iq of the current vector converted in the d-q coordinate system, their amplitudes Id, Iq can be obtained by detecting their respective peak values of the components id, iq as shown in FIG. 25. Further, their superimposed current phases φid, φiq can be obtained by detecting their zero-cross times of the components id, iq. At sequent step S243, a phase angle θ is calculated from d-axis to a long axis of an ellipse within ±90 degrees. At step S244, P-control or PI-control is performed in order to make the detected phase angle θ coincident with the target phase angle θ to output an angular speed ω₀. As the target phase angle θ, a phase angle 0 degrees may be used, or the other value corresponding the torque that is experimentally obtained may be used in order to improve a phase angle estimation accuracy. At step S245, the angular speed ω₀ is integrated by the integration circuit to output the d-axis phase angle θ₀. These operations (steps S243 to S244) are performed in the d-axis detecting unit 18'.

In this embodiment to detect the long axis on the d/q-axes, however, the expressions (3), (9), (10) and (11) in the first and second embodiments will be modified to the following expressions (13), (14), (15) and (16), respectively.

$$a = \frac{1}{2}[\sqrt{\{I_d^2 + I_q^2 + 2I_dI_q|\sin(\psi_{id} - \psi_{iq})|\}} + \qquad (13)$$
$$\sqrt{\{I_d^2 + I_q^2 - 2I_dI_q|\sin(\psi_{id} - \psi_{iq})|\}}]$$
$$b = \frac{1}{2}[\sqrt{\{I_d^2 + I_q^2 + 2I_dI_q^2|\sin(\psi_{id} - \psi_{iq})|\}} - $$
$$\sqrt{\{I_d^2 + I_q^2 - 2I_dI_q|\sin(\psi_{id} - \psi_{iq})|\}}]$$

$$a+b = \sqrt{\{I_d^2 + I_q^2 + 2I_dI_q|\sin(\psi_{id} - \psi_{iq})|\}} \qquad (14)$$

$$\sqrt{(a^2+b^2)} = \sqrt{(I_d^2 + I_q^2)} \qquad (15)$$

$$ab = I_dI_q|\sin(\psi_{id} - \psi_{iq})| \qquad (16)$$

As the method of applying a high-frequency voltage, there is also another method of applying the voltage on the d/q-axes (in the rotating coordinate system) besides the application of the voltage through a three-phase converting unit (in the static coordinate system). That is, in the first to third embodiments, a high-frequency current is superimposed on a drive current by superimposing a high-frequency voltage command generated from the high-frequency rotating voltage generating unit 14 on a three-phase voltage command outputted from the three-phase converting unit 13. While, according to the above-mentioned method, it may be carried out to superimpose the high-frequency voltage command generated from the high-frequency rotating voltage generating unit 14 on a d/q-axes voltage command generated from the current control unit 12. Since the so-superimposed "high-frequency current" has a large frequency in comparison with the rotational frequency (i.e. frequency of the motor drive current), the superimposition of a voltage command on the d/q-axes allows a slippage of frequency to be eliminated during the rotation of a motor although the superimposition of a high-frequency voltage command on a three-phase voltage command can exhibit little influence on the drive of a motor.

Figure 26:
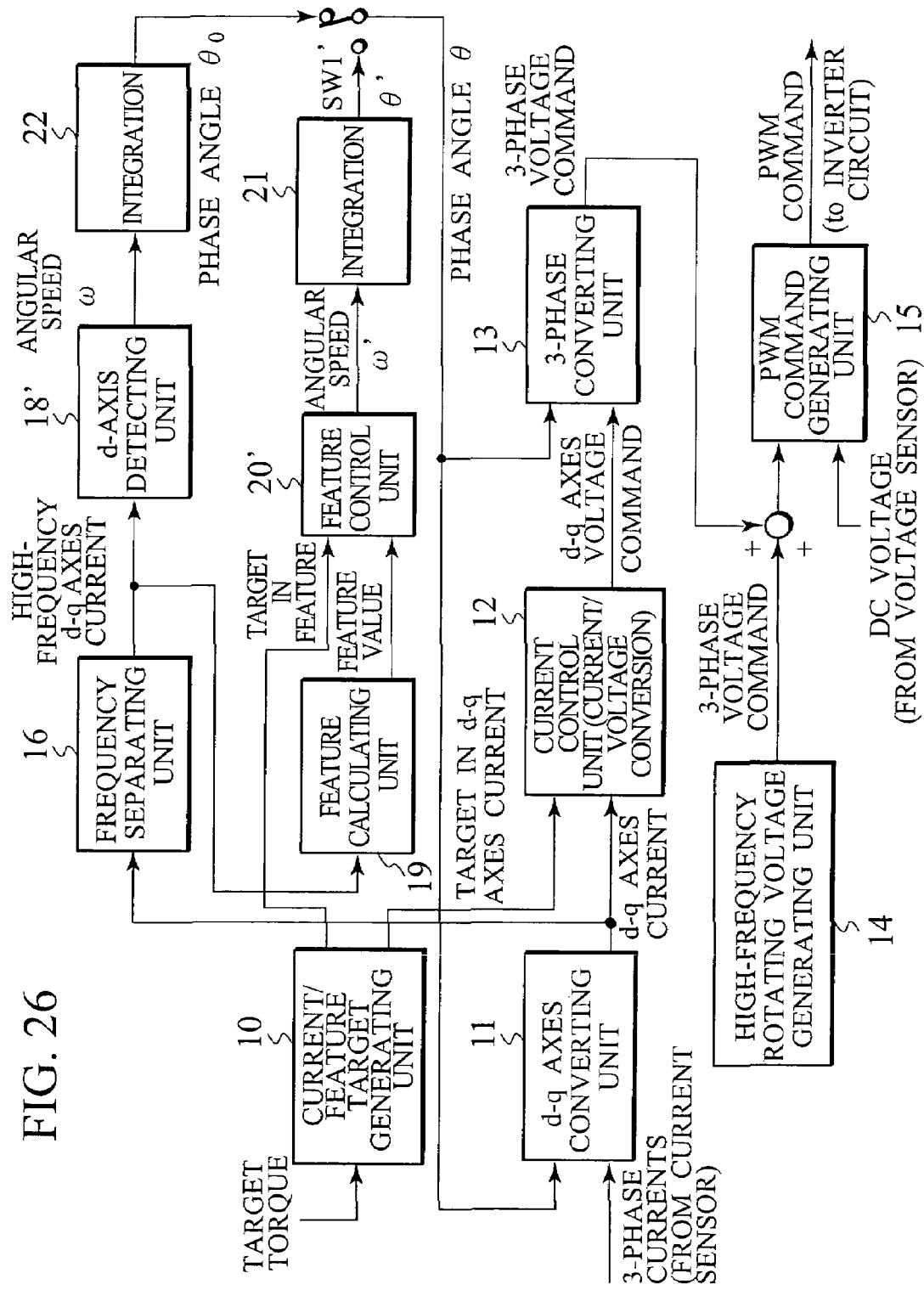
FIG. 26 is a block diagram showing the details of the control device of FIG. 1, in accordance with the fourth embodiment of the present invention.

Next, FIG. 26 is a block diagram, showing the details of the control device 1 of FIG. 1, in accordance with the fourth embodiment of the invention. In this embodiment, as similar to the above-mentioned third embodiment, the d-axis detecting unit 18' detects both amplitude and phase by detecting respective peak values and zero-cross periods of the d-axis component id and the q-axis component iq of the current vector (after separating high-frequency components) converted onto the d/q-axes. Further, at the d-axis detecting unit 18', it is executed to multiply the so-detected amplitude and phase by a regular thereby outputting an angular speed ω.

Then, in the integrating circuit 22, the angular speed ω is integrated to generate a d-axis phase angle θ₀ for output.

On the other hand, as similar to the second embodiment, the characteristic-feature control unit 20' outputs an angular speed ω'[rad/s]. Then, the angular speed ω' is integrated to calculate a phase angle θ' [rad] by an integrating circuit 21.

With the exception of high load zone causing magnetic saturation, the switch SW1' is connected with the integrating circuit 22 to transmit a d-axis phase angle θ₀ from the circuit 22 to the following circuit, in the form of a phase angle θ. In the high load zone causing magnetic saturation, the switch SW1' is connected to the integrating circuit 21 to transmit a value θ', which is obtained as a result of integrating an angular speed ω', to the following circuit, in the form of a phase angle θ.

Figure 27:
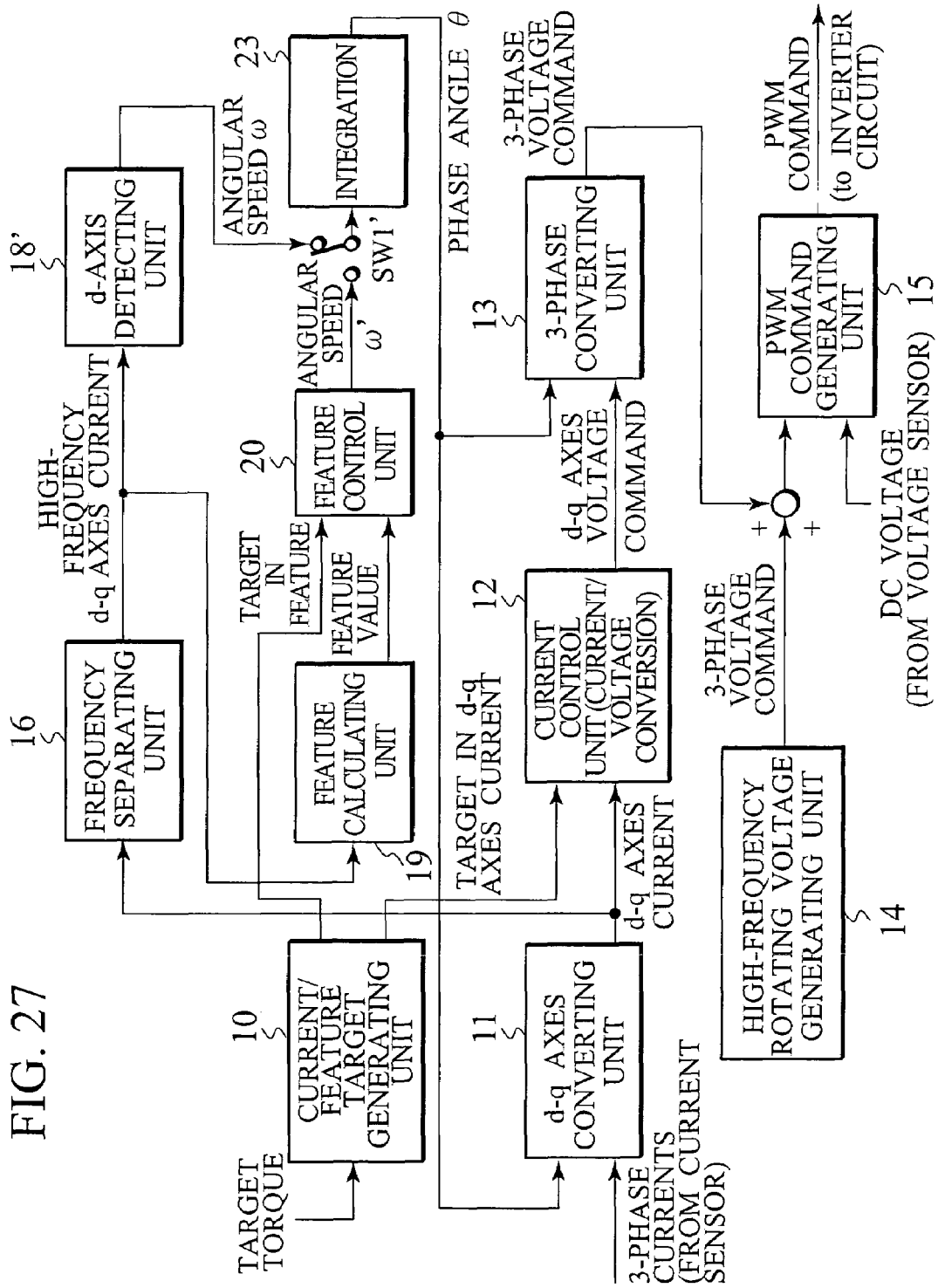
FIG. 27 is a block diagram showing the details of the control device of FIG. 1, in accordance with the fifth embodiment of the present invention.

Next, FIG. 27 is a block diagram, showing the details of the control device 1 of FIG. 1, in accordance with the fifth embodiment of the invention.

In FIG. 27, the angular speed ω from the d-axis detecting unit 18' is transmitted to the switch SW1' directly, while the characteristic-feature control unit 20' outputs an angular speed ω', as similar to the embodiment of FIG. 26. Then, the switch SW1' is connected with the characteristic-feature control unit 20' in a high-load zone causing magnetic saturation. Except the high-load zone, the switch SW1' is connected with the d-axis detecting unit 18'. Therefore, in the high-load zone, the integrating circuit 23 integrates the angular speed ω' from the characteristic-feature control unit 20' to output a phase angle θ. Except the high-load zone, the integrating circuit 23 integrates the angular speed ω from the d-axis detecting unit 18' to output a phase angle θ.

Note, in switching an angle θ as shown in the embodiments of FIGS. 22 and 23, if there is a difference between the phase calculated at the d-axis detecting unit 18' and the phase calculated at the characteristic-feature control unit 20', there is produced a skip in phase. While, in case of switching an angular speed ω in this embodiment, it is possible to solve the above problem of phase-skipping.

Figure 28:
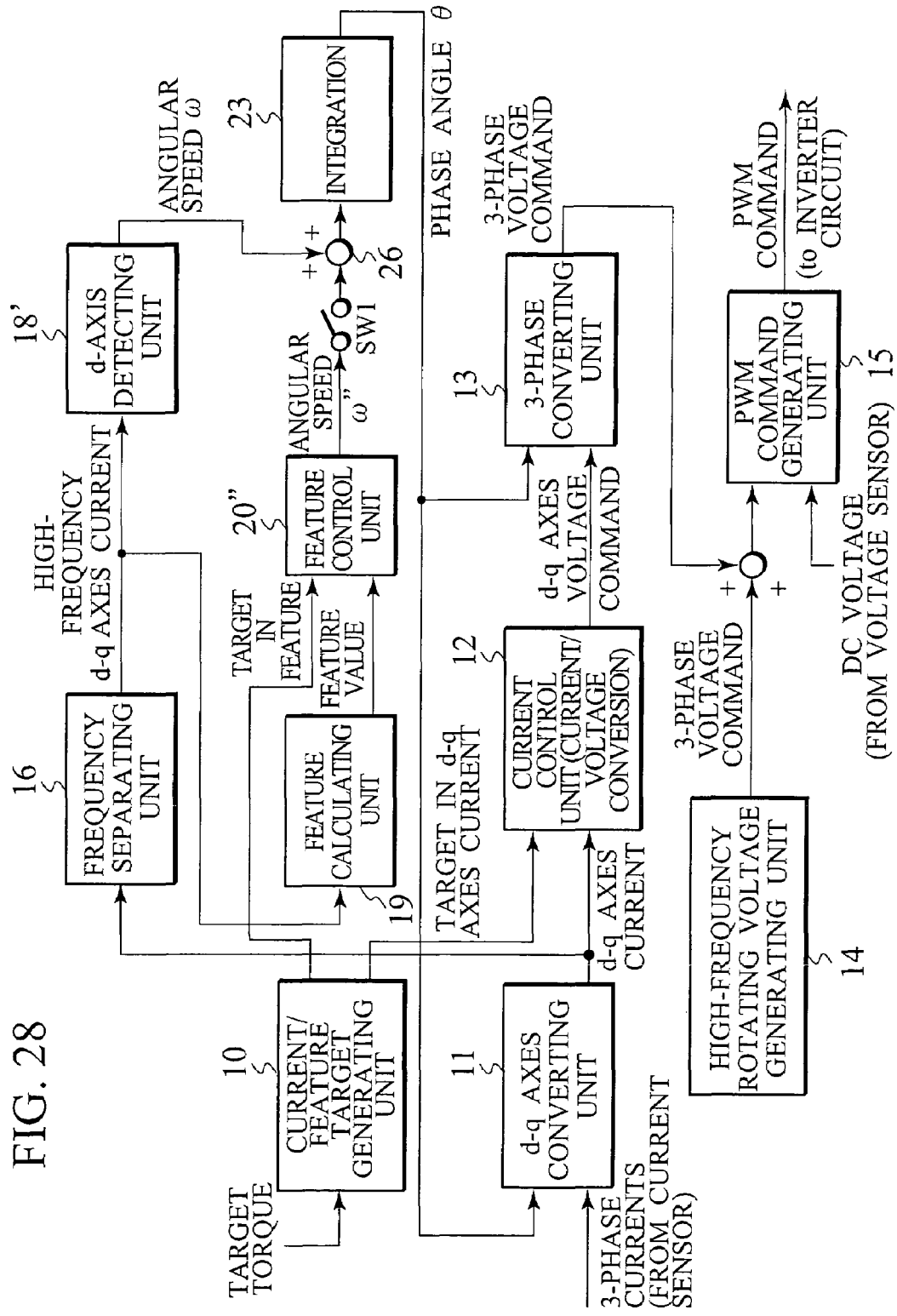
FIG. 28 is a block diagram showing the details of the control device of FIG. 1, in accordance with the sixth embodiment of the present invention.

Next, FIG. 28 is a block diagram, showing the details of the control device 1 of FIG. 1, in accordance with the sixth embodiment of the invention.

In FIG. 28, the angular speed ω outputted from the d-axis detecting unit 18' is transmitted to the accumulator 26 directly. While the characteristic-feature control unit 20" outputs a correction angular speed ω". In a high-load zone where the switch SW1' is turned on, the correction angular speed ω" is added to the angular speed ω at the accumulator 26.

The integrating circuit 23 integrates an output from the accumulator 26 and further outputs a phase angle θ. Therefore, except the high-load zone, the integrating circuit 23 integrates the angular speed ω outputted from the d-axis detecting unit 18' to output the phase angle θ. While, in the high-load zone, the integrating circuit 23 integrates a value obtained by correcting the angular speed ω by the correction angular speed ω" to output a phase angle θ. Note, although the arithmetic expression of a correction angular speed ω" is similar to the expressions (12) and (12'), as evidenced by these expressions (12) and (12'), the characteristic-feature control unit 20" operates in a manner that the target value in characteristic feature ft* accords with the characteristic feature ft, so that an output of the unit 20" becomes the correction angular speed ω". As the angular speed ω is switched in this embodiment as well, there is no possibility of occurrence of a phase-skipping that would be caused if there is a difference between the phase calculated at the d-axis detecting unit and the phase calculated at the characteristic-feature control unit in switching an angle θ.

Figure 29:
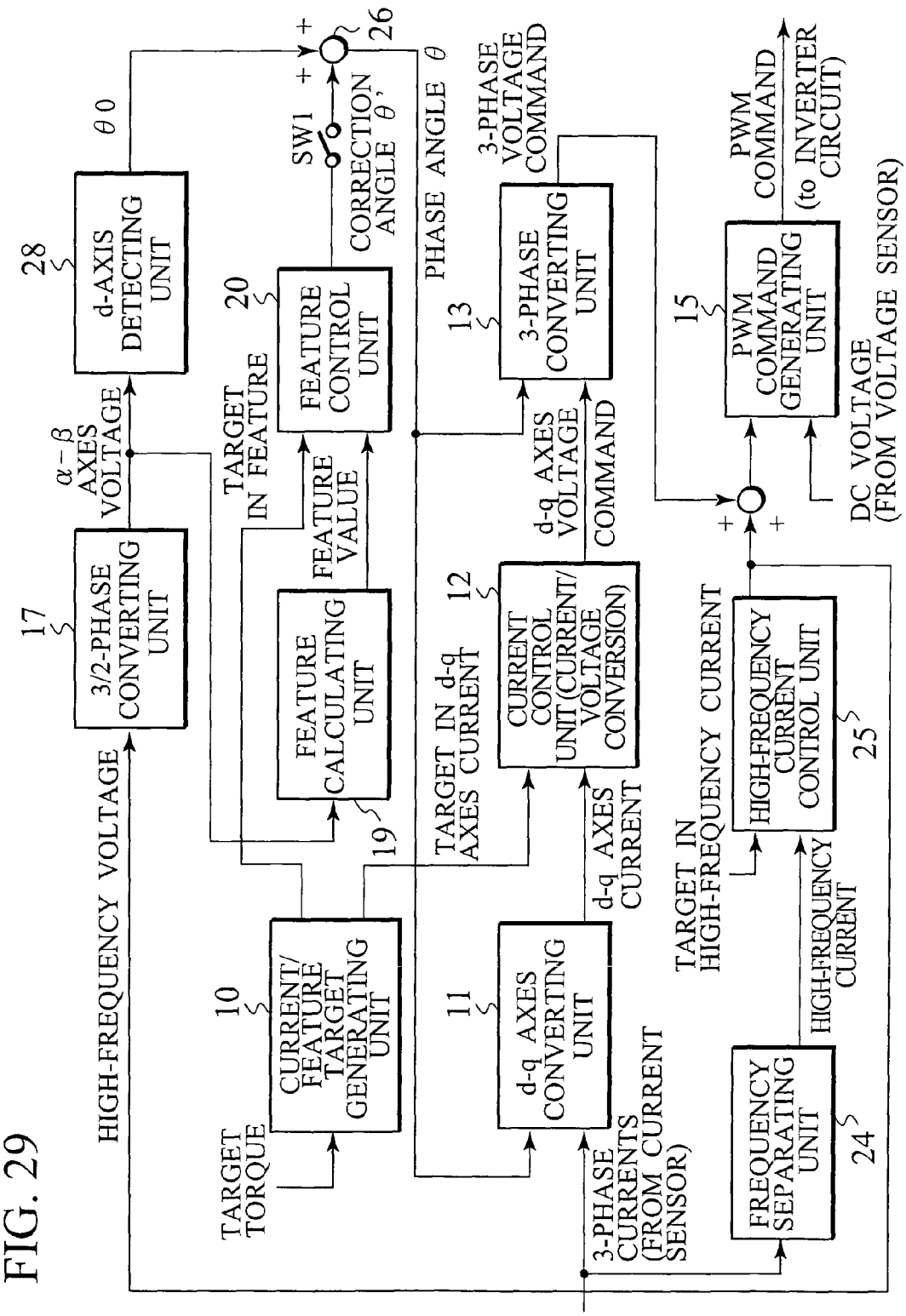
FIG. 29 is a block diagram showing the details of the control device of FIG. 1, in accordance with the seventh embodiment of the present invention.

Next, FIG. 29 is a block diagram, showing the details of the control device 1 of FIG. 1, in accordance with the seventh embodiment of the invention.

In common with the first embodiment to the sixth embodiment, the voltage vector locus of the high-frequency current to be superimposed draws a perfect circle and the d-axis phase angle is corrected on the basis of at least one of the length of a long axis and that of a short axis of the current vector locus of the above high-frequency current. While, in the seventh embodiment, the current vector locus of the high-frequency current to be superimposed draws a perfect circle and the d-axis phase angle is corrected on the basis of at least one of the length of a long axis and that of a short axis of the voltage vector locus of the above high-frequency current.

In FIG. 29, a frequency separating unit 24 separates a high-frequency current from a three-phase currents inputted from the current sensor 4, by means of a general frequency filter.

Figure 30A:
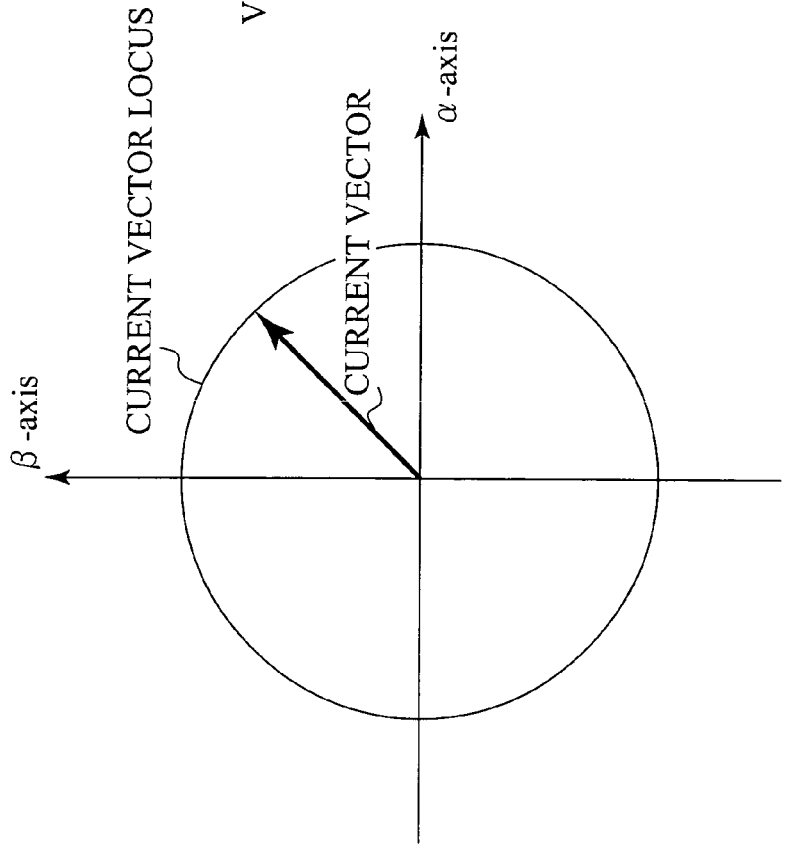
FIG. 30A is a diagram showing a current vector locus drawing a perfect circle.

A high-frequency current control unit 25 inputs the above high-frequency current and a target value in high-frequency current. Further, the unit 25 performs PI control etc. so that a high-frequency current vector locus draws a perfect circle (see FIG. 30A) to generate a high-frequency three-phase voltage command.

As for the high-frequency control, as mentioned before, it can be carried out on the d/q-axes (in the rotating coordinate system) in place of the three-phase control (in the static coordinate system). In this way, when the high-frequency control is carried out on the d/q-axes while performing the detection of a d-axis and the control of a characteristic feature on the d/q-axes, there is no slippage of frequency during the rotation of a motor When the above high-frequency three-phase voltage command is converted to a vector, it follows an elliptic locus as shown in FIG. 30B. In a low load zone causing no magnetic saturation, the long axis of the ellipse points to a q-axis (i.e. a position of maximum inductance). Thus, the detection of a d-axis can be accomplished by deducting 90 degrees from the phase of the q-axis. That is, the 3/2-phase converting unit 17 inputs the high-frequency three-phase voltage command from the high-frequency current control unit 25 and outputs a voltage in the α/β-axes of coordinates as shown in FIG. 30B. The d-axis detecting unit 28 calculates a d-axis phase angle $θ_0$ by deducting 90 degrees from the phase of the q-axis in the above way and outputs the phase angle $θ_0$. Noted that the above phase angle of the long axis (i.e. q-axis) of the ellipse can be calculated by using an expression that results from the replacement of the members of Iα, Iβ, Vα and Vβ in the expression (1) by the members of $φiα$, $φiβ$, $φvα$ and $φvβ$, respectively.

As for the correction by a characteristic feature in a high load zone, a phase is corrected by maintaining a predetermined value of a characteristic feature based on at least one of the length of a long axis of the ellipse of FIG. 30B and that of a short axis. This characteristic feature is shown in FIGS. 9, 11, 13, 15, 17, 19 and 21.

Note, in the properties of FIGS. 9, 11, 13, 15, 17, 19 and 21, the characteristic features have upward-sloping features as the drive current phase angle β increases. Therefore, if an actual characteristic feature is smaller than its target value, the detection phase is advanced (increasing of the correction angle θ') so as to advance the rotating coordinate system while fixing the drive current phase angle β at a constant, thereby producing an effect to put the current phase angle β forwardly. While, if an actual characteristic feature is larger than its target value, the detection phase is delayed (decreasing of the correction angle θ') so as to retard the rotating coordinate system while fixing the drive current phase angle β at a constant, thereby producing an effect to put the current phase angle β backwardly. Then, the control gains are determined by way of experiments. Note, as the feature (i.e. the characteristic of the calculation (a/b) of FIG. 15, if a characteristic feature has a feature of downward-sloping as the drive current phase angle β increases, the above-mentioned relationship between advance and delay is reversed.

Figure 31:
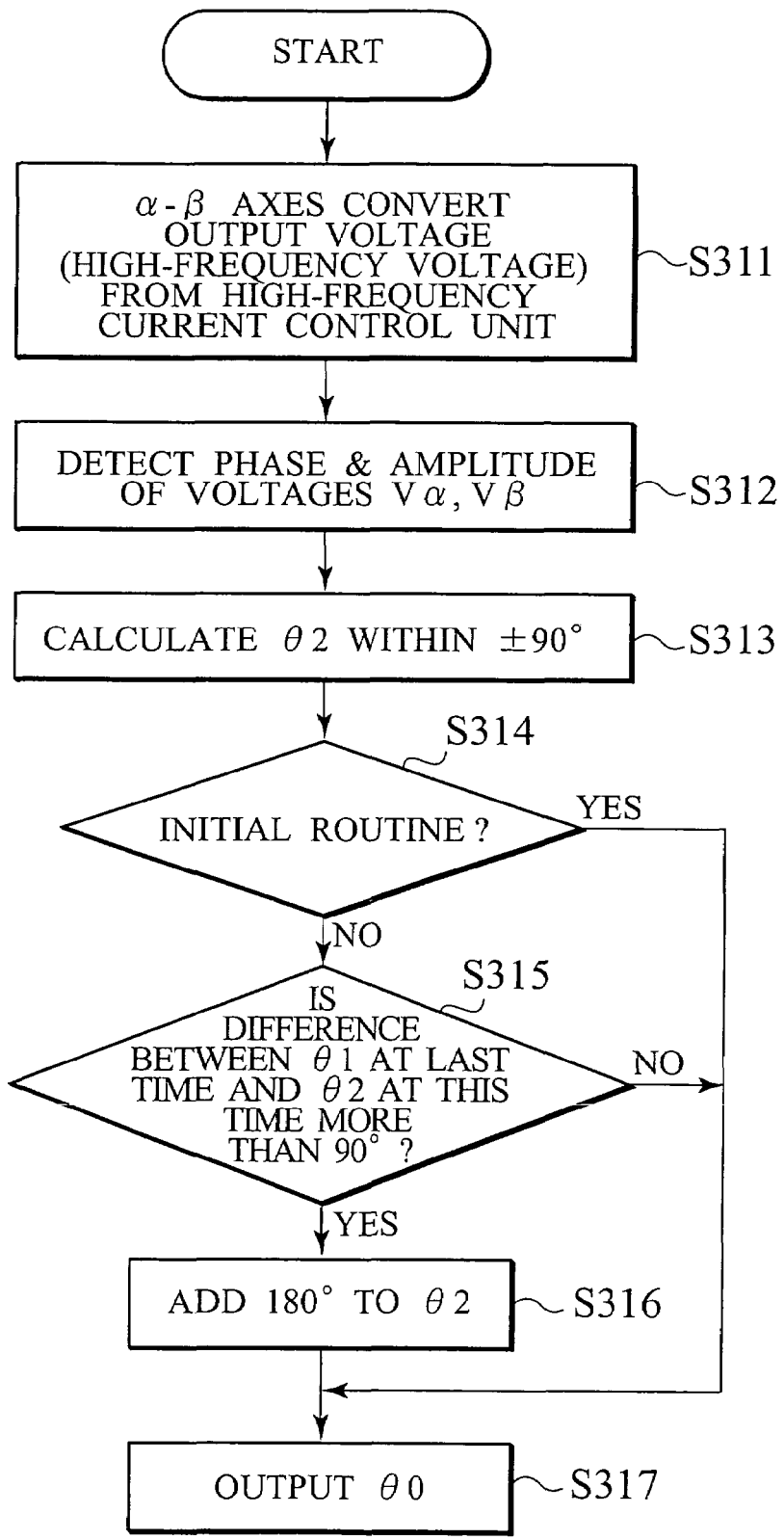
FIG. 31 is a flow chart of the process to start the torque control in case of no magnetic saturation (except a high load zone) in the seventh embodiment.

FIG. 31 is a flow chart of the process to start the torque control in case of no magnetic saturation (out of a high load zone), corresponding to the operation of FIG. 4B. Note, the successive steps shown in FIG. 31 follow the flow chart of FIG. 4B.

Figure 32:
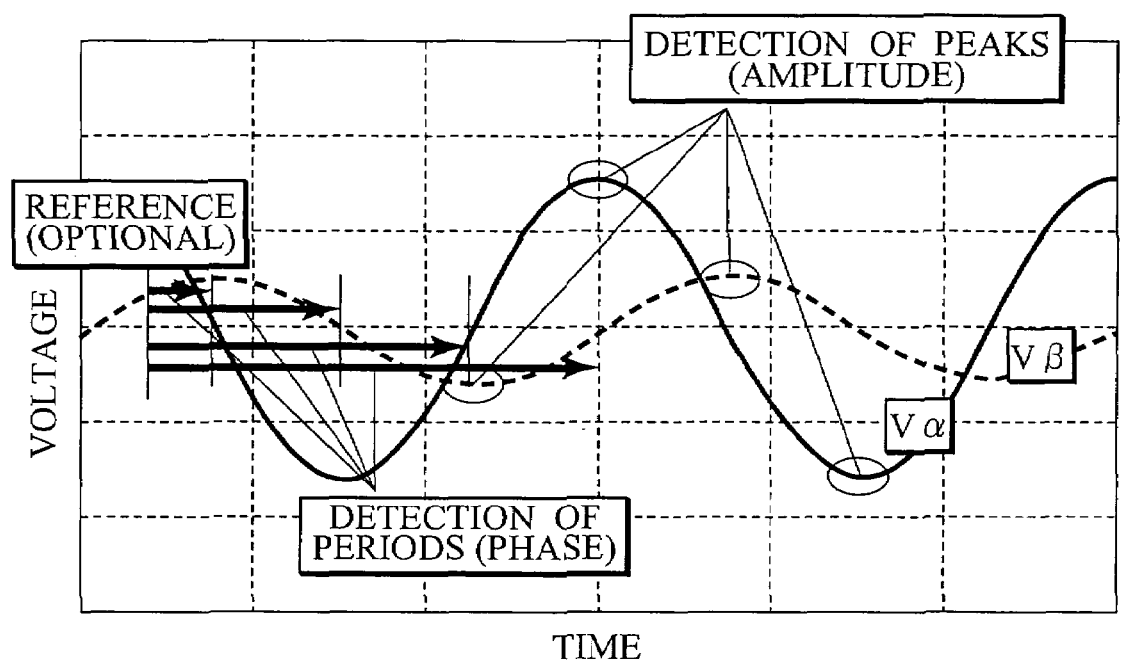
FIG. 32 is a diagram to explain a method of detecting phases $\phi v\alpha$ and $\phi v\beta$ in the seventh embodiment.

In the flow chart of FIG. 31, at step S311, a voltage outputted from the high-frequency current control unit 25 is converted onto the α/β-axes by the 3/2-phase converting unit thereby to establish a state as shown in FIG. 3B. At sequent step S312, as for the α-axis component vα and the β-axis component vβ of a voltage vector converted in the α/β-coordinate system, their respective peak values are detected to obtain their amplitudes and phases, as shown in FIG. 32. Subsequently, the operations at step S313 to step S317 are similar to those executed at step S7 to step S11 of FIG. 4B.

In case of detecting the long axis from a voltage vector locus on the α/β-axes as this embodiment, the expressions (3), (9), (10) and (11) in the first and second embodiments will be modified to the following expressions (17), (18), (19) and (20), respectively.

$$a = \frac{1}{2}[\sqrt{\{V_α^2 + V_β^2 + 2V_α V_β |\sin(\psi_{V_α} - \psi_{V_β})|\}} + \sqrt{\{V_α^2 + V_β^2 - 2V_α V_β |\sin(\psi_{V_α} - \psi_{V_β})|\}}] \quad (17)$$

$$b = \frac{1}{2}[\sqrt{\{V_α^2 + V_β^2 + 2V_α V_β |\sin(\psi_{V_α} - \psi_{V_β})|\}} - \sqrt{\{V_α^2 + V_β^2 - 2V_α V_β |\sin(\psi_{V_α} - \psi_{V_β})|\}}]$$

$$a + b = \sqrt{\{V_α^2 + V_β^2 + 2V_α V_β |\sin(\psi_{V_α} - \psi_{V_β})|\}} \quad (18)$$

$$\sqrt{(a^2+b^2)} = \sqrt{(V_α^2+V_β^2)} \quad (19)$$

$$ab = V_α V_β |\sin(\psi_{V_α} - \psi_{V_β})| \quad (20)$$

Figure 33:
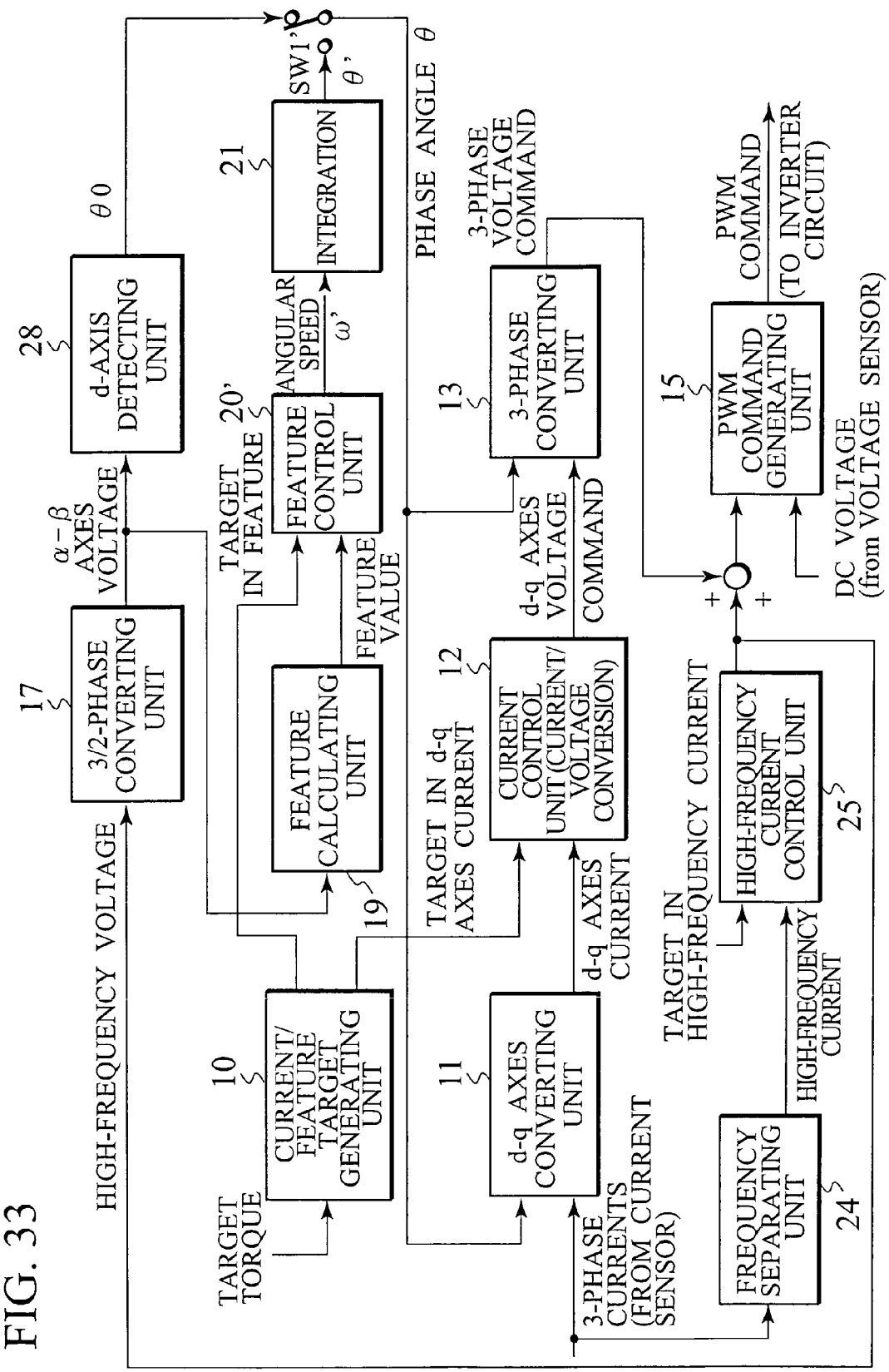
FIG. 33 is a block diagram showing the details of the control device of FIG. 1, in accordance with the eighth embodiment of the present invention.

Next, FIG. 33 is a block diagram, showing the details of the control device 1 of FIG. 1, in accordance with the eighth embodiment of the invention.

In the correction of a d-axis phase angle on a basis of at least one of the length of a long axis of a voltage vector locus on the α/β-axes of a high-frequency current and the length of a short axis of the same, according to the embodiment, a d-axis phase angle $θ_0$ is calculated from an α/β-axes voltage and a phase angle θ' is calculated by integrating the detected angular speed ω' detected from the characteristic feature". Further, either the d-axis phase angle $θ_0$ or the phase angle θ' is outputted in switching. The constitution of this embodiment corresponds to that of the second embodiment (see FIG. 22) employing a current vector.

In FIG. 33, the d-axis detecting unit 18 calculates the d-axis phase angle $θ_0$ based on an α/β-axes voltage vector locus. While, at the characteristic-feature control unit 20', an angular speed ω'[rad/s] is calculated. Then, the so-calculated angular speed ω' is integrated to calculate a phase angle θ'

[rad] by an integrating circuit 21. With the exception of high load zone, the switch SW1' is connected with the d-axis detecting unit 28 to output the d-axis phase angle $\theta_0$ as a phase angle. In the high load zone causing magnetic saturation, the switch SW1' is connected to the integrating circuit 21 to output the phase angle $\theta$' as a phase angle.

Noted that the angular speed $\omega$ is calculated by the above expression (12).

Figure 34:
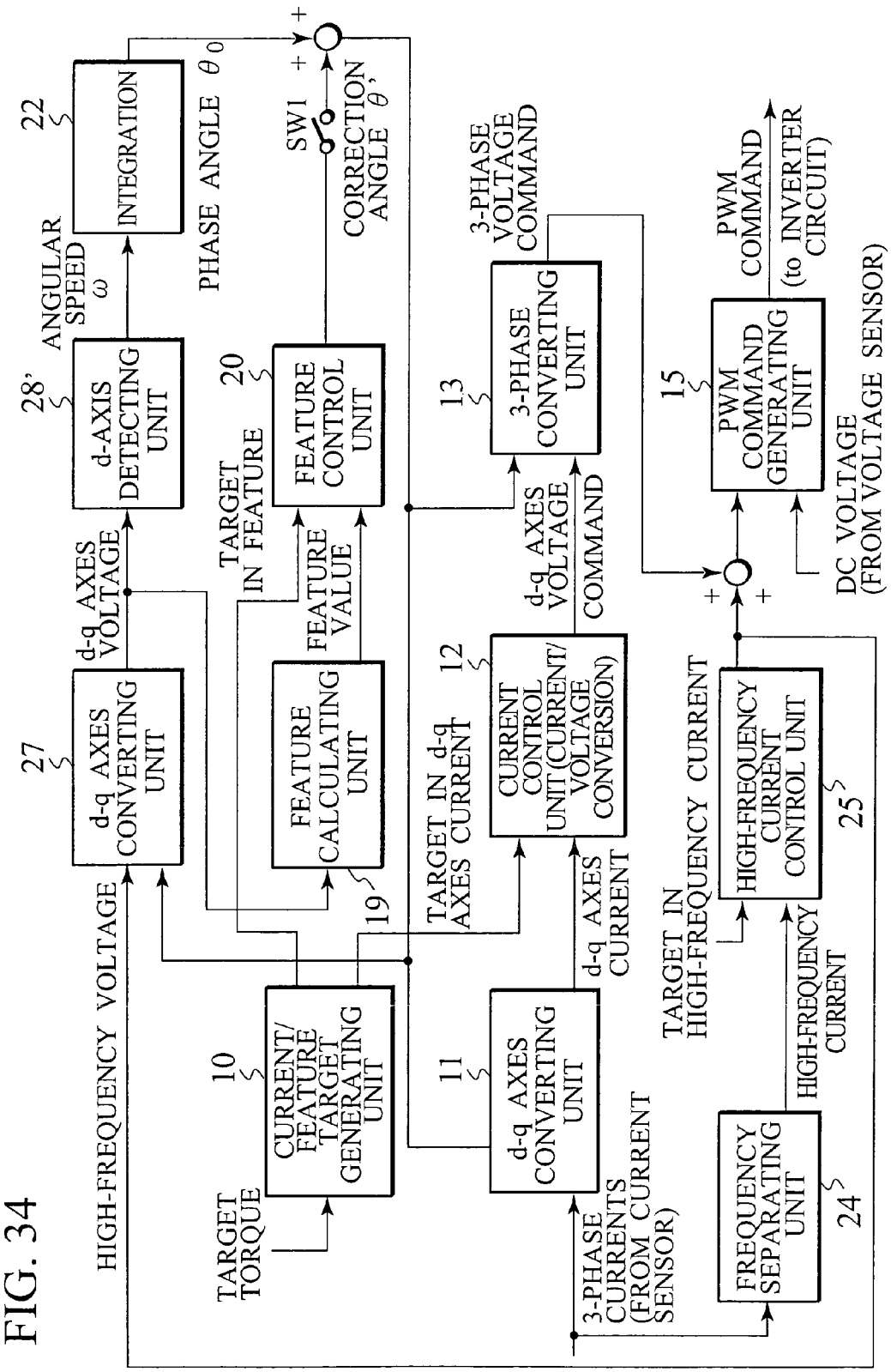
FIG. 34 is a block diagram showing the details of the control device of FIG. 1, in accordance with the ninth embodiment of the present invention.

Next, FIG. 34 is a block diagram, showing the details of the control device 1 of FIG. 1, in accordance with the ninth embodiment of the invention.

In the arrangement to correct a d-axis phase angle based on at least one of the length of a long axis of a voltage vector locus on the d/q-axes of a high-frequency current and the length of a short axis of the same, according to the embodiment, a d-axis phase angle $\theta_0$ is calculated from a d/q-axes voltage by employing an angular speed $\omega$.

The constitution of this embodiment corresponds to that of the third embodiment (see FIG. 23) employing a current vector.

According to the ninth embodiment, the d-axis/q-axis converting unit 27 converts a high-frequency voltage to a d/q-axes voltage on the d/q-axes conversion. While, at the d-axis detecting unit 28', both amplitude and phase of the voltage vector are determined by detecting respective peak values and zero-cross periods of the d-axis component vd and the q-axis component vq of the voltage vector locus converted onto the d/q-axes. At this time, although an angle $\theta$ between the d-axis and the long axis of an ellipse is similar to that of the above expression (1) expect to alter the members of I$\alpha$, I$\beta$, $\phi$i$\alpha$ and $\phi$i$\beta$ to the members of vd, vq, $\phi$vd and $\phi$vq, respectively, it is executed to multiply the angle $\theta$ by a regular coefficient (i.e. proportional calculation) thereby outputting an angular speed $\omega$. Then, in the integrating circuit 22, the angular speed $\omega$ is integrated to generate a d-axis phase angle $\theta_0$ for output.

Note, as similar to the third embodiment (FIG. 23), the angular speed $\omega$ may be calculated by a PI (proportional integrating) calculation. Or again, on condition of having map-tables with every torque each defining the relationship between a torque detected by an experiment in advance and the corresponding angle $\theta$ from the d-axis to the long axis of an ellipse and further determining the angle $\theta$ corresponding to a target torque by means of the specified map-table, it is possible to improve the accuracy of an estimated phase.

The characteristic-feature control unit 20 outputs a correction angle $\theta$' from a d/q-axes voltage. In a high-load zone where the switch SW1 is turned ON, the characteristic-feature control unit 20 corrects the d-axis phase angle $\theta_0$ by the correction angle $\theta$' to provide a phase angle $\theta$, as similar to FIG. 23.

Figure 35:
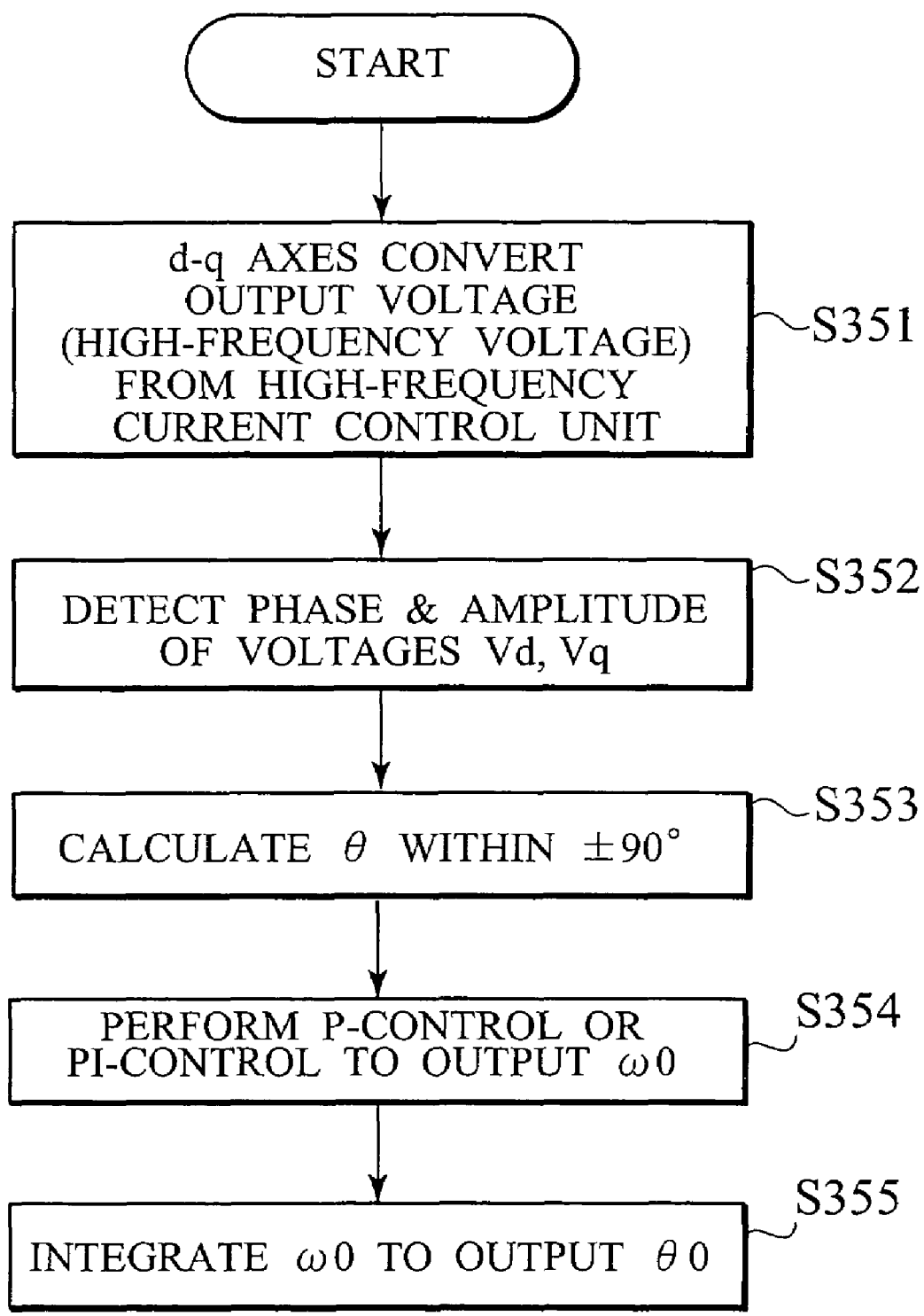
FIG. 35 is a flow chart of the process to start the torque control in case of no magnetic saturation (except a high load zone) in the ninth embodiment.

FIG. 35 is a flow chart of the process to start the torque control in case of no magnetic saturation (out of a high load zone), corresponding to the operation of FIG. 4B. Note, the successive steps shown in FIG. 35 follow the flow chart of FIG. 4A.

Figure 36:
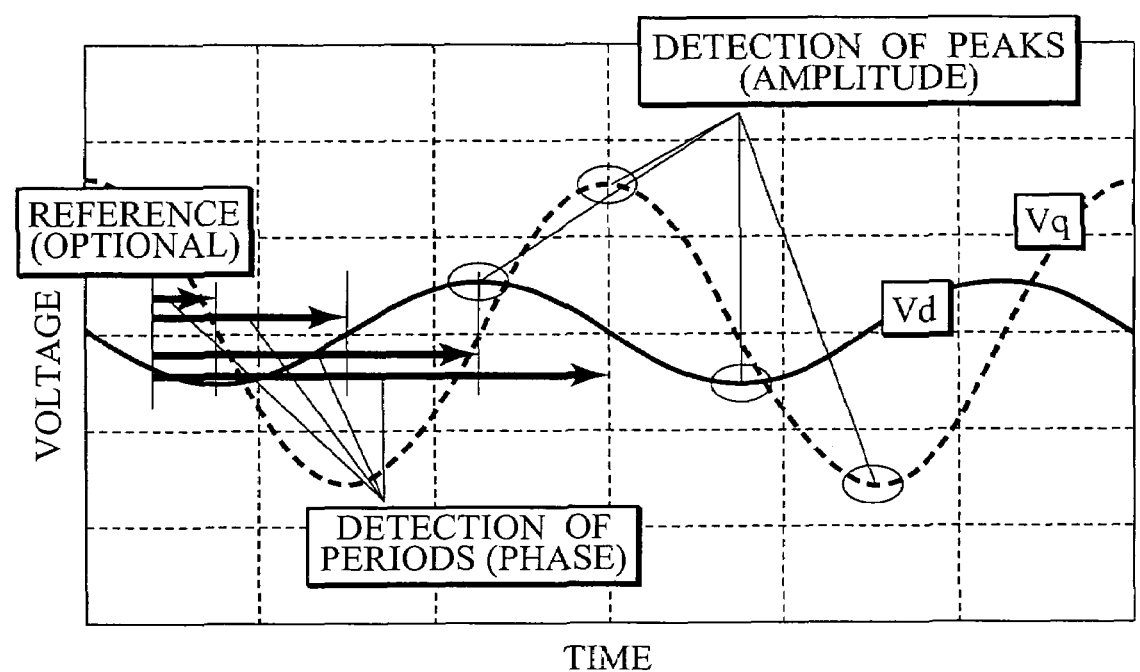
FIG. 36 is a diagram to explain a method of detecting phases $\phi vd$ and $\phi vq$ in the ninth embodiment.

In the flow chart of FIG. 35, at step S351, a voltage outputted from the high-frequency current control unit 25 is converted onto the d/q-axes thereby to establish a state as shown in FIG. 30B. At sequent step S312, as for the d-axis component vd and the q-axis component vq of a voltage vector converted in the d/q-coordinate system, their respective peak values are detected to obtain their amplitudes Vd, Vq and phases $\phi$vd, $\phi$vq, as shown in FIG. 36. Subsequently, the operations at step S353 to step S355 are similar to those executed at step S243 to step S245 of FIG. 24.

Similarly to the third embodiment, due to the detection of the long axis on the d/q-axes, the present embodiment has an advantage of eliminating detection errors since the locus of a high-frequency voltage vector comes to a standstill while drawing an ellipse on the d/q-axes when the motor rotates at regular revolutions.

Besides, in detecting the long axis on the d/q-axes as this embodiment, the expressions (3), (9), (10) and (11) in the first and second embodiments will be modified to the following expressions (21), (22), (23) and (24), respectively.

$$a = \frac{1}{2}[\sqrt{\{V_d^2 + V_q^2 + 2V_dV_q|\sin(\psi_{V_d} - \psi_{V_q})|\}} + \sqrt{\{V_d^2 + V_q^2 - 2V_dV_q|\sin(\psi_{V_d} - \psi_{V_q})|\}}] \quad (21)$$

$$b = \frac{1}{2}[\sqrt{\{V_d^2 + V_q^2 + 2V_dV_q^2|\sin(\psi_{V_d} - \psi_{V_q})|\}} - \sqrt{\{V_d^2 + V_q^2 - 2V_dV_q|\sin(\psi_{V_d} - \psi_{V_q})|\}}]$$

$$a+b=\sqrt{\{V_d^2+V_q^2+2V_dV_q|\sin(\psi_{Vd}-\psi_{Vq})|\}} \quad (22)$$

$$\sqrt{(a^2+b^2)}=\sqrt{(V_d^2+V_q^2)} \quad (23)$$

$$ab=V_dV_q|\sin(\psi_{Vd}-\psi_{Vq})| \quad (24)$$

Figure 37:
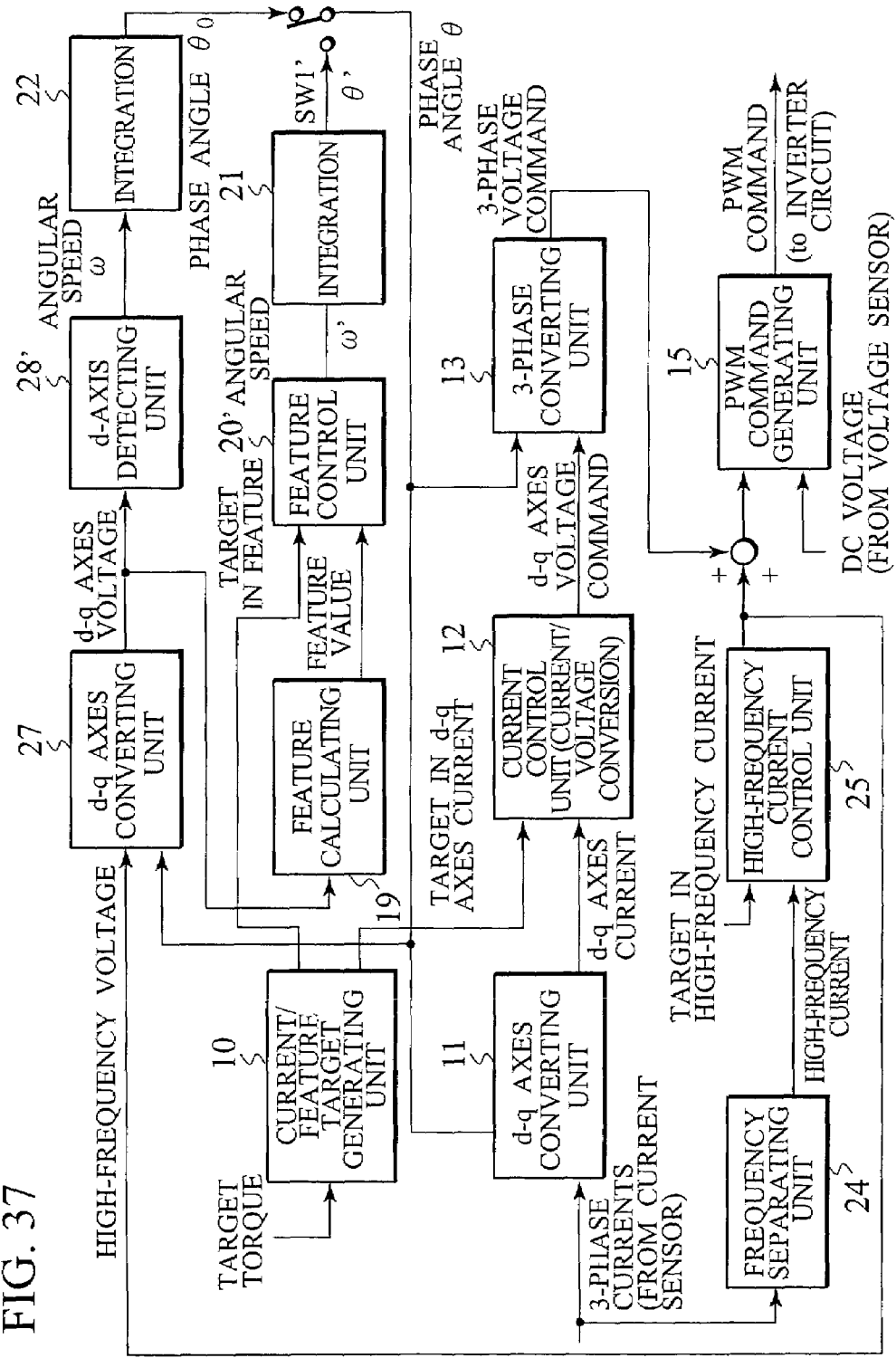
FIG. 37 is block diagram showing the details of the control device of FIG. 1, in accordance with the tenth embodiment of the present invention.

Next, FIG. 37 is a block diagram, showing the details of the control device 1 of FIG. 1, in accordance with the tenth embodiment of the invention.

In the arrangement to correct a d-axis phase angle based on at least one of the length of a long axis of a voltage vector locus on the d/q-axes of a high-frequency current and the length of a short axis of the same, according to the embodiment, a d-axis phase angle $\theta_0$ is calculated from a d/q-axes voltage by employing an angular speed $\omega$. In addition, a d-axis phase angle $\theta$' is also calculated from a characteristic feature with an angular speed $\omega$'. In this embodiment, either the d-axis phase angle $\theta_0$ or the d-axis phase angle $\theta$' is outputted in switching.

In FIG. 37, the d-axis detecting unit 28', both amplitude and phase of the voltage vector are determined by detecting respective peak values and zero-cross periods of the d-axis component vd and the q-axis component vq of the voltage vector locus (after separation of high frequency) converted onto the d/q-axes. Then, the amplitude and phase are multiplied by a regular coefficient thereby outputting an angular speed $\omega$. Then, in the integrating circuit 22, the angular speed $\omega$ is integrated to generate a d-axis phase angle $\theta_0$ for output.

On the other hand, the characteristic-feature control unit 20' outputs an angular speed $\omega$' [rad/s] and thereafter, it is further integrated to calculate a phase angle $\theta$' [rad] by the integrating circuit 21.

With the exception of high load zone causing magnetic saturation, the switch SW1' is connected with the integrating circuit 22 to transmit the d-axis phase angle $\theta_0$ from the circuit 22 to the succeeding circuit, as the phase angle $\theta$. In the high load zone causing magnetic saturation, the switch SW1' is connected to the integrating circuit 21 to transmit the phase angle $\theta$' obtained as a result of integrating the angular speed $\omega$' to the succeeding circuit, as the phase angle $\theta$.

Figure 38:
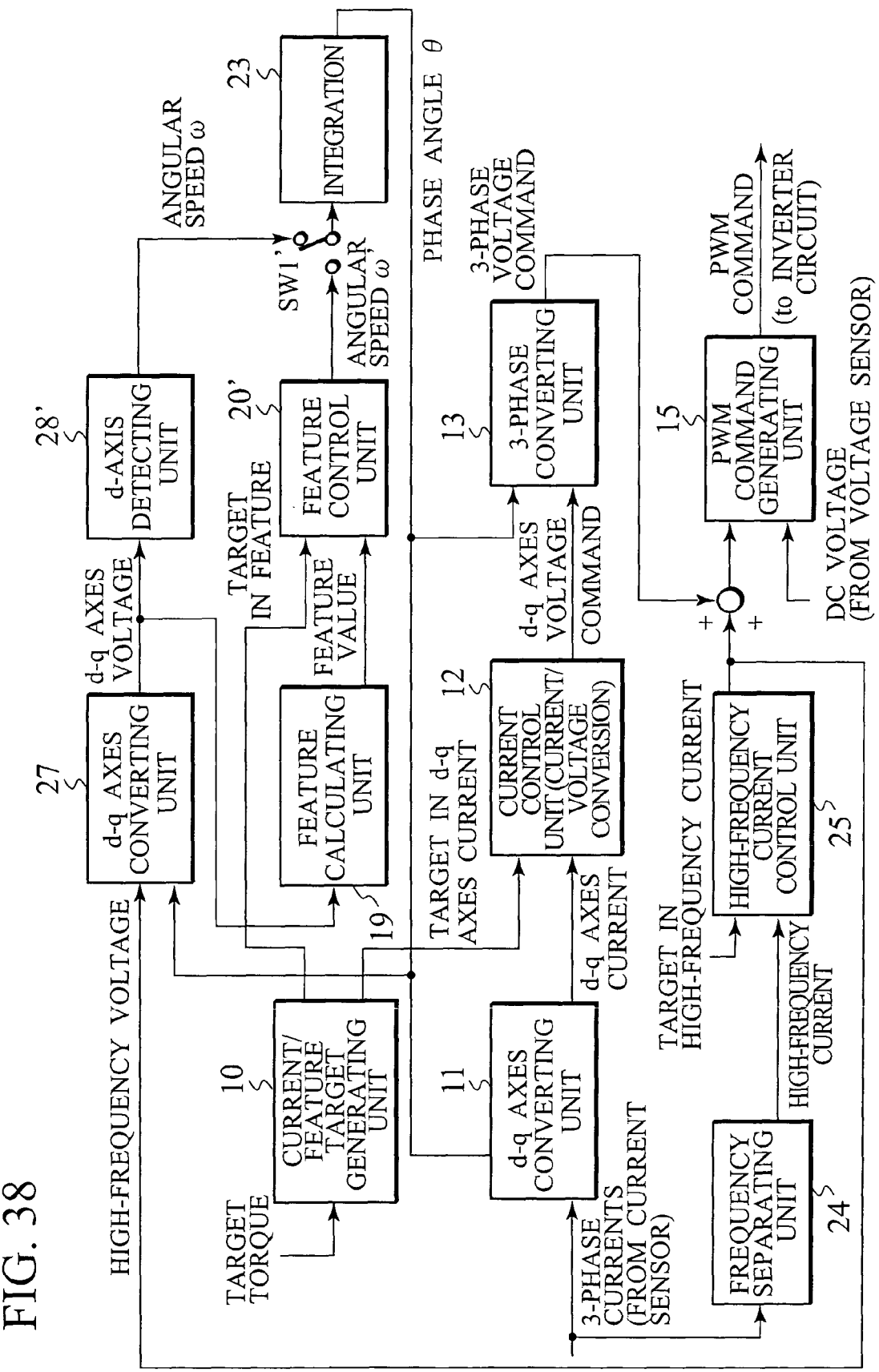
FIG. 38 is a block diagram showing the details of the control device of FIG. 1, in accordance with the eleventh embodiment of the present invention.

Next, FIG. 38 is a block diagram, showing the details of the control device 1 of FIG. 1, in accordance with the eleventh embodiment of the invention.

In this embodiment, the integrating circuit 23 for integrating an angular speed $\omega$ in the tenth embodiment is connected to the backside of the switch SW1'.

In FIG. 38, an angular speed ω from the d-axis detecting unit 28' is transmitted to the switch SW1' directly, while the characteristic-feature control unit 20' outputs an angular speed ω', as similar to the embodiment of FIG. 37. Then, the switch SW1' is connected with the characteristic-feature control unit 20' in a high-load zone causing magnetic saturation. Except the high-load zone, the switch SW1' is connected with the d-axis detecting unit 28'. Therefore, in the high-load zone, the integrating circuit 23 integrates the angular speed ω' from the characteristic-feature control unit 20' to output a phase angle θ. Except the high-load zone, the integrating circuit 23 integrates the angular speed ω from the d-axis detecting unit 28' to output a phase angle θ.

According to the constitution of FIG. 38, as similar to the fifth embodiment (see FIG. 27), since the switching operation is carried out in the form of an angular speed ω, it is possible to solve the above problem of phase-skipping in switching the phase angle θ.

Figure 39:
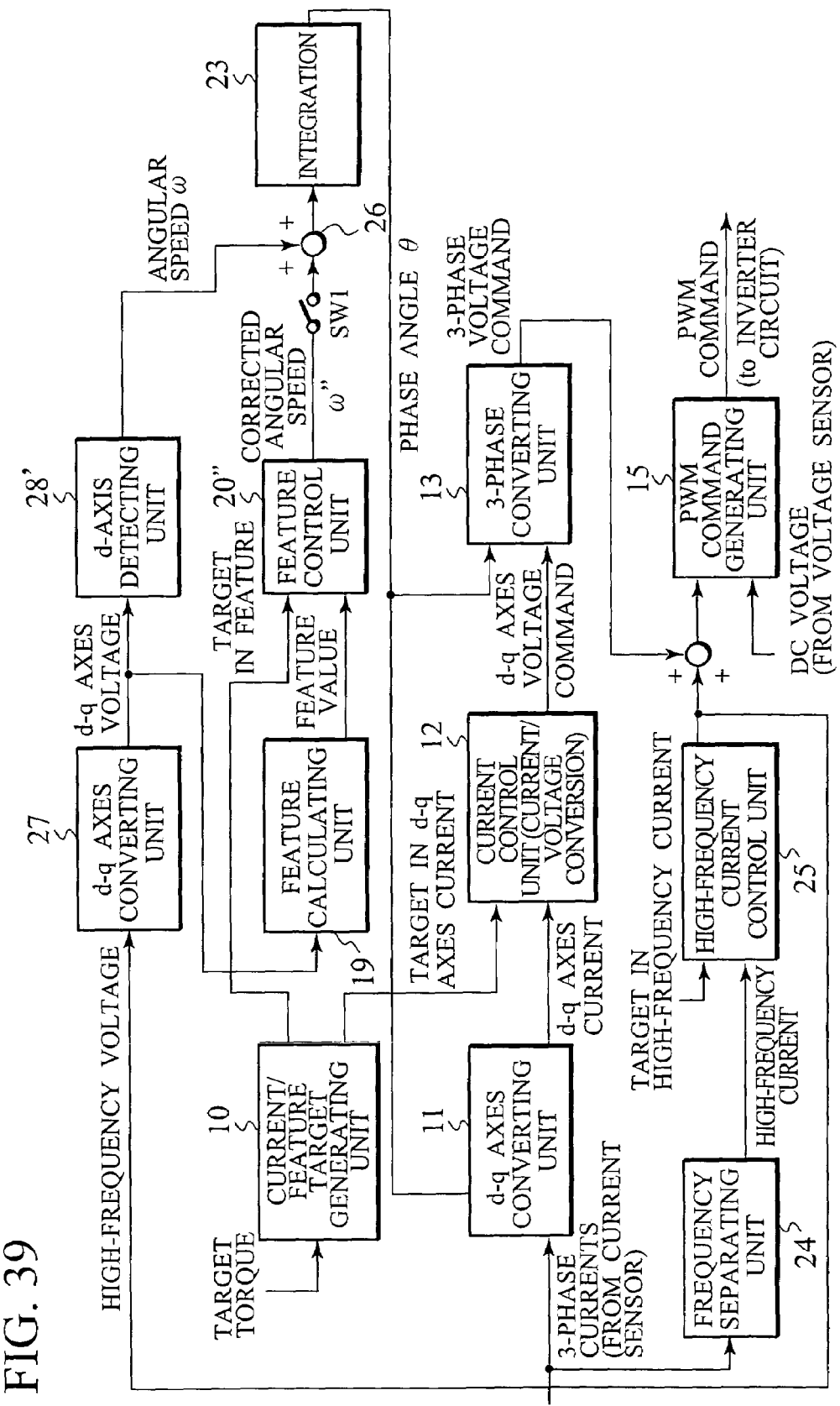
FIG. 39 is a block diagram showing the details of the control device of FIG. 1, in accordance with the twelfth embodiment of the present invention.

Next, FIG. 39 is a block diagram, showing the details of the control device 1 of FIG. 1, in accordance with the twelfth embodiment of the invention.

In the correction of a d-axis phase angle on a basis of at least one of the length of a long axis of a voltage vector locus on the α/β-axes of a high-frequency current and the length of a short axis of the same, according to the embodiment, an angular speed ω' is corrected by a correction angular speed ω". The constitution of this embodiment corresponds to a constitution resulting from the application of the sixth embodiment (see FIG. 28) to a "voltage vector" type constitution. Noted that the calculation of the correction angular speed ω" employs the expressions (12) and (12'), as similar to the sixth embodiment.

In FIG. 39, the angular speed ω outputted from the d-axis detecting unit 28' is transmitted to the accumulator 26 directly. While the characteristic-feature control unit 20" outputs the correction angular speed ω". In a high-load zone where the switch SW1' is turned on, the correction angular speed ω" is added to the angular speed ω at the accumulator 26.

The integrating circuit 23 integrates an output from the accumulator 26 and further outputs a phase angle θ. Therefore, except the high-load zone, the integrating circuit 23 integrates the angular speed ω outputted from the d-axis detecting unit 28' to output the phase angle θ. While, in the high-load zone, the integrating circuit 23 integrates a value obtained by correcting the angular speed ω by the correction angular speed ω" to output a phase angle θ. Also in this embodiment, as the angular speed ω is switched, there is no possibility of occurrence of a phase-skipping that would be caused if there is a difference between the phase calculated at the d-axis detecting unit and the phase calculated at the characteristic-feature control unit in switching an angle θ.

Finally, it will be understood by those skilled in the art that the foregoing descriptions are nothing but some embodiments of the disclosed control device for an electric motor. Besides these embodiments, various changes and modifications may be made to the present invention without departing from the spirit and scope of the invention.

Japanese Patent Applications No. 2002-222623 filed on Jul. 31, 2002 and No. 2003-271330 filed on Jul. 7, 2003 are incorporated by reference herein in its entirety.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the invention as set forth in the appended claims.

The scope of the invention is defined with reference to the following claims.

What is claimed is:

1. A control device for an electric motor, comprising:
an inverter circuit connected to a direct-current power source to convert a power from the direct-current power source to an alternating current power, thereby driving the electric motor by the alternating current power;
a control unit for controlling the operation of the inverter circuit on the basis of a target torque;
a superimposing unit for superimposing a superimposed current on a drive current for driving the electric motor, the superimposed current having a frequency different from a frequency of the drive current;
a feature target generating unit for calculating a target value of a feature based on at least one of the length of a long axis of a current vector locus and the length of a short axis thereof, corresponding to the target torque;
a separating unit for separating the superimposed current from the drive current supplied to the electric motor;
an actual feature detecting unit detecting an actual value of the feature based on at least one of the length of the long axis of a current vector locus of the superimposed current separated by the separating unit and the length of the short axis thereof; and
a phase angle detecting unit for detecting a phase angle of the electric motor on the basis of the target value calculated by the feature target generating unit and the actual value detected by the actual feature detecting unit,
wherein the control unit controls the operation of the inverter circuit on the basis of the phase angle detected by the phase angle detecting unit.

2. The control device for the electric motor of claim 1, wherein
the phase angle detecting unit includes a d-axis phase angle detecting unit for detecting a d-axis phase angle from the current vector locus of the superimposed current, and
the phase angle detecting unit detects the phase angle by correcting the d-axis phase angle detected by the d-axis phase angle detecting unit, on the basis of the target value calculated by the feature target generating unit and the actual value detected by the actual feature detecting unit.

3. The control device for the electric motor of claim 1, wherein
the phase angle detecting unit calculates an angular speed on the basis of the target value calculated by the feature target generating unit and the actual value detected by the actual feature detecting unit, thereby detecting the phase angle of the electric motor based on the angular speed.

4. The control device for the electric motor of claim 1, wherein the phase angle detecting unit comprises:
a d-axis phase angle detecting unit for detecting a d-axis phase angle from the current vector locus of the separated superimposed current;
a correcting angle calculating unit for calculating a correcting angle on the basis of the target value calculated by the feature target generating unit and the actual value detected by the actual feature detecting unit; and a phase angle correcting unit for correcting the d-axis phase angle by the correcting angle, wherein the control unit controls the operation of the inverter circuit on the basis of the phase angle corrected by the phase angle correcting unit.

5. The control device for the electric motor of claim 4, wherein the phase angle correcting unit corrects the d-axis phase angle detected by the d-axis phase angle detecting unit only in a high load zone where the drive current of the electric motor is more than a predetermined value.

6. The control device for the electric motor of claim 1, wherein the phase angle detecting unit comprises:

a first d-axis phase angle detecting unit for detecting a first d-axis phase angle from the current vector locus of the separated superimposed current;

a second d-axis phase angle detecting unit that detects an angular speed ω on the basis of the target value calculated by the feature target generating unit and the actual value detected by the actual feature detecting unit and that integrates the detected angular speed ω thereby detecting a second d-axis phase angle; and a switching unit for switching the first d-axis phase angle detecting unit and the second d-axis phase angle detecting unit to each other thereby outputting either the first d-axis phase angle or the second d-axis phase angle, wherein the control unit controls the operation of the inverter circuit on the basis of the first or second phase angle outputted from the switching unit.

7. The control device for the electric motor of claim 6, wherein the switching unit supplies the d-axis phase angle detected by the second d-axis phase angle detecting unit only in a high load zone where the drive current of the electric motor is more than a predetermined value.

8. The control device for the electric motor of claim 1, wherein the phase angle detecting unit comprises:

a d-axis phase angle detecting unit for detecting and integrating an angular speed from the current vector locus of the separated superimposed current thereby detecting a d-axis phase angle;

a correcting angle calculating unit for calculating a correcting angle on the basis of the target value calculated by the feature target generating unit and the actual value detected by the actual feature; and a phase angle correcting unit for correcting the d-axis phase angle by the correcting angle, wherein the control unit controls the operation of the inverter circuit on the basis of the phase angle corrected by the phase angle correcting unit.

9. The control device for the electric motor of claim 1, wherein the phase angle detecting unit comprises:

a first d-axis phase angle detecting unit for detecting and integrating an angular speed from the current vector locus of the separated superimposed current thereby detecting a first d-axis phase angle;

a second d-axis phase angle detecting unit that detects an angular speed ω on the basis of the target value calculated by the feature target generating unit and the actual value detected by the actual feature detecting unit and that integrates the detected angular speed ω thereby detecting a second d-axis phase angle; and a switching unit for switching the first d-axis phase angle detecting unit and the second d-axis phase angle detecting unit to each other thereby outputting either the first d-axis phase angle or the second d-axis phase angle, wherein the control unit controls the operation of the inverter circuit on the basis of the first or second phase angle outputted from the switching unit.

10. The control device for the electric motor of claim 1, wherein the phase angle detecting unit comprises:

an angular speed detecting unit for detecting an angular speed from the current vector locus of the separated superimposed current;

a correcting angle speed calculating unit for calculating a correcting angle speed on the basis of the target value calculated by the feature target generating unit and the actual value detected by the actual feature detecting unit;

an angular speed correcting unit for correcting the angular speed by the correcting angle speed; and a phase angle calculating unit for integrating an output of the angular speed correcting unit thereby calculating a phase angle, wherein the control unit controls the operation of the inverter circuit on the basis of the phase angle calculated by the phase angle calculating unit.

11. The control device for the electric motor of claim 10, wherein the angular speed correcting unit corrects the angular speed detected by the angular speed detecting unit only in a high load zone where the drive current of the electric motor is more than a predetermined value.

12. The control device for the electric motor of claim 1, wherein the phase angle detecting unit comprises:

a first angular speed detecting unit for detecting an angular speed from the current vector locus of the separated superimposed current;

a second angular speed detecting unit for detecting an angular speed o on the basis of the target value calculated by the feature target generating unit and the actual value detected by the actual feature detecting unit;

a switching unit for switching the first angular speed detecting unit and the second angular speed detecting unit to each other thereby outputting either the angular speed or the angular speed ω; and a phase angle calculating unit that integrates an output of the switching unit thereby calculating a phase angle, and the control unit controls the operation of the inverter circuit on the basis of the phase angle outputted from the phase angle calculating unit.

13. The control device for the electric motor of claim 12, wherein the switching unit outputs the angular speed detected by the second angular speed detecting unit only in a high load zone where the drive current of the electric motor is more than a predetermined value.

14. The control device for the electric motor of claim 1, wherein the phase angle detecting unit detects the phase angle of the electric motor by using, as the target value and the actual value, the product a×b of the length a of the long axis and the length b of the short axis of the current vector locus.

15. The control device for the electric motor of claim 1, wherein the phase angle detecting unit detects the phase angle of the electric motor by using, as the target value and the actual value, the ratio b/a of the length b of the short axis to the length a of the long axis of the current vector locus.

16. The control device for the electric motor of claim 1, wherein
the phase angle detecting unit detects the phase angle of the electric motor by using, as the target value and the actual value, a value obtained by inserting the length a of the long axis and the length b of the short axis of the current vector locus into an expression of:

$\sqrt{(a^2+b^2)}\div(a+b)$.

17. The control device for the electric motor of claim 1, wherein
the current vector locus is a locus of a current on a/β-axes.

18. The control device for the electric motor of claim 1, wherein
the current vector locus is a locus of a current on d-q axes.

19. The control device for the electric motor of claim 1, wherein
the superimposed current is a high-frequency current whose voltage vector locus is a perfect circle,
the high-frequency current is superimposed on the drive current for driving the electric motor, and
the phase angle is detected on the basis of at least one of the length of a long axis of a current vector locus of the high-frequency current and the length of a short axis thereof.

20. The control device for the electric motor of claim 1, wherein the phase angle detecting unit comprises:
an angular speed detecting unit for detecting an angular speed from the voltage vector locus of the separated superimposed current;
a correcting angle speed calculating unit for calculating a correcting angle speed on the basis of the target value calculated by the feature target generating unit and the actual value detected by the actual feature detecting unit;
an angular speed correcting unit for correcting the angular speed by the correcting angle speed; and
a phase angle calculating unit for integrating an output of the angular speed correcting unit thereby calculating a phase angle, and
the control unit controls the operation of the inverter circuit on the basis of the phase angle calculated by the phase angle calculating unit.

21. The control device for the electric motor of claim 20, wherein
the angular speed correcting unit corrects the angular speed detected by the angular speed detecting unit only in a high load zone where the drive current of the electric motor is more than a predetermined value.

22. A control device for an electric motor, comprising:
an inverter circuit connected to a direct-current power source to convert a power from the direct-current power source to an alternating current power, thereby driving the electric motor by the alternating current power;
a control unit for controlling the operation of the inverter circuit on the basis of a target torque;
a superimposing means for superimposing a superimposed current on a drive current for driving the electric motor, the superimposed current having a frequency different from a frequency of the drive current;
a feature target generating unit for calculating a target value of a feature based on at least one of the length of a long axis of a voltage vector locus and the length of a short axis thereof, corresponding to the target torque;
a separating unit for separating the superimposed current from the drive current supplied to the electric motor;
an actual feature detecting unit detecting an actual value of the feature based on at least one of the length of the long axis of a voltage vector locus of the superimposed current separated by the separating unit and the length of the short axis thereof and
a phase angle detecting unit for detecting a phase angle of the electric motor on the basis of the target value calculated by the feature target generating unit and the actual value detected by the actual feature detecting unit,
wherein the control unit controls the operation of the inverter circuit on the basis of the phase angle detected by the phase angle detecting unit.

23. The control device for the electric motor of claim 22, wherein
the phase angle detecting unit includes a d-axis phase angle detecting unit for detecting a d-axis phase angle from the voltage vector locus of the superimposed current, and
the phase angle detecting unit detects the phase angle by correcting the d-axis phase angle detected by the d-axis phase angle detecting unit, on the basis of the target value calculated by the feature target generating unit and the actual value detected by the actual feature detecting unit.

24. The control device for the electric motor of claim 22, wherein
the phase angle detecting unit calculates an angular speed on the basis of the target value calculated by the feature target generating unit and the actual value detected by the actual feature detecting unit, thereby detecting the phase angle of the electric motor based on the calculated angular speed.

25. The control device for the electric motor of claim 22, wherein the phase angle detecting unit comprises:
a d-axis phase angle detecting unit for detecting a d-axis phase angle from the voltage vector locus of the separated superimposed current;
a correcting angle calculating unit for calculating a correcting angle on the basis of the target value calculated by the feature target generating unit and the actual value detected by the actual feature detecting unit; and
a phase angle correcting unit for correcting the d-axis phase angle by the correcting angle,
wherein the control unit controls the operation of the inverter circuit on the basis of the phase angle corrected by the phase angle correcting unit.

26. The control device for the electric motor of claim 25, wherein
the phase angle correcting unit corrects the d-axis phase angle detected by the d-axis phase angle detecting unit only in a high load zone where the drive current of the electric motor is more than a predetermined value.

27. The control device for the electric motor of claim 22, wherein the phase angle detecting unit comprises:
a first d-axis phase angle detecting unit for detecting a first d-axis phase angle from the voltage vector locus of the separated superimposed current;
a second d-axis phase angle detecting unit that detects an angular speed ω on the basis of the target value calculated by the feature target generating unit and the actual value detected by the actual feature detecting unit and that integrates the detected angular speed ω thereby detecting a second d-axis phase angle; and
a switching unit for switching the first d-axis phase angle detecting unit and the second d-axis phase angle detecting unit to each other thereby outputting either the first d-axis phase angle or the second d-axis phase angle, wherein the control unit controls the operation of the inverter circuit on the basis of the first or second phase angle outputted from the switching unit.

28. The control device for the electric motor of claim 27, wherein the switching unit corrects the d-axis phase angle detected by the second d-axis phase angle detecting unit only in a high load zone where the drive current of the electric motor is more than a predetermined value.

29. The control device for the electric motor of claim 22, wherein the phase angle detecting unit comprises:

a d-axis phase angle detecting unit for detecting and integrating an angular speed from the voltage vector locus of the separated superimposed current thereby detecting a d-axis phase angle;

a correcting angle calculating unit for calculating a correcting angle on the basis of the target value calculated by the feature target generating unit and the actual value detected by the actual feature; and a phase angle correcting unit for correcting the d-axis phase angle by the correcting angle, wherein the control unit controls the operation of the inverter circuit on the basis of the phase angle corrected by the phase angle correcting unit.

30. The control device for the electric motor of claim 22, wherein the phase angle detecting unit comprises:

a first d-axis phase angle detecting unit for detecting and integrating an angular speed from the voltage vector locus of the separated superimposed current thereby detecting a first d-axis phase angle;

a second d-axis phase angle detecting unit that detects an angular speed $\omega$ on the basis of the target value calculated by the feature target generating unit and the actual value detected by the actual feature detecting unit and that integrates the detected angular speed $\omega$ thereby detecting a second d-axis phase angle; and a switching unit for switching the first d-axis phase angle detecting unit and the second d-axis phase angle detecting unit to each other thereby outputting either the first d-axis phase angle or the second d-axis phase angle, wherein the control unit controls the operation of the inverter circuit on the basis of the first or second phase angle outputted from the switching unit.

31. The control device for the electric motor of claim 22, wherein the phase angle detecting unit comprises:

a first angular speed detecting unit for detecting an angular speed from the voltage vector locus of the separated superimposed current;

a second angular speed detecting unit for detecting an angular speed $\omega$ on the basis of the target value calculated by the feature target generating unit and the actual value detected by the actual feature detecting unit;

a switching unit for switching the first angular speed detecting unit and the second angular speed detecting unit to each other thereby outputting either the angular speed or the angular speed $\omega$; and a phase angle calculating unit that integrates an output of the switching unit thereby calculating a phase angle, wherein the control unit controls the operation of the inverter circuit on the basis of the phase angle outputted from the phase angle calculating unit.

32. The control device for the electric motor of claim 31, wherein the switching unit outputs the angular speed detected by the second angular speed detecting unit only in a high load zone where the drive current of the electric motor is more than a predetermined value.

33. The control device for the electric motor of claim 22, wherein the phase angle detecting unit detects the phase angle of the electric motor by using, as the target value and the actual value, the product a×b of the length a of the long axis and the length b of the short axis of the voltage vector locus.

34. The control device for the electric motor of claim 22, wherein the phase angle detecting unit detects the phase angle of the electric motor by using, as the target value and the actual value, the ratio b/a of the length b of the short axis to the length a of the long axis of the voltage vector locus.

35. The control device for the electric motor of claim 22, wherein the phase angle detecting unit detects the phase angle of the electric motor by using, as the target value and the actual value, a value obtained by inserting the length a of the long axis and the length b of the short axis of the voltage vector locus into an expression of:

$\sqrt{(a^2+b^2)} \div (a+b)$.

36. The control device for the electric motor of claim 22, wherein the voltage vector locus is a locus of a current on $\alpha$-$\beta$ axes.

37. The control device for the electric motor of claim 22, wherein the voltage vector locus is a locus of a current on d-q axes.

38. The control device for the electric motor of claim 22, wherein the superimposed current is a high-frequency current whose current vector locus is a perfect circle, the high-frequency current is superimposed on the drive current for driving the electric motor, and the d-axis phase angle is corrected on the basis of at least one of the length of a long axis of a voltage vector locus of the high-frequency current and the length of a short axis thereof.

39. A control device for an electric motor, comprising:

an inverter circuit connected to a direct-current power source to convert a power from the direct-current power source to an alternating current power, thereby driving the electric motor by the alternating current power;

control means for controlling the operation of the inverter circuit on the basis of a target torque;

superimposing means for superimposing a superimposed current on a drive current for driving the electric motor, the superimposed current having a frequency different from a frequency of the drive current;

feature target generating means for calculating a target value of a feature based on at least one of the length of a long axis of a current vector locus and the length of a short axis thereof, corresponding to the target torque;

separating means for separating the superimposed current from the drive current supplied to the electric motor;

actual feature detecting means for detecting an actual value of the feature based on at least one of the length of the long axis of a current vector locus of the superimposed current separated by the separating means and the length of the short axis thereof; and phase angle detecting means for detecting a phase angle of the electric motor on the basis of the target value calculated by the feature target generating means and the actual value detected by the actual feature detecting means, wherein the control means controls the operation of the inverter circuit on the basis of the phase angle detected by the phase angle detecting unit.

40. A method for controlling an electric motor having an inverter circuit connected to a direct-current power source to convert a power from the direct-current power source to an alternating current power for driving the electric motor, the method comprising:

calculating a target value of a feature based on at least one of the length of a long axis of a current vector locus and the length of a short axis thereof, corresponding to a target torque for the electric motor;

superimposing a superimposed current on a drive current for driving the electric motor thereby detecting an actual value of the feature based on at least one of the length of the long axis of a current vector locus of the superimposed current and the length of the short axis thereof, the superimposed current having a different frequency from that of the drive current;

detecting a phase angle of the electric motor on the basis of the target value and the actual value; and controlling the operation of the inverter circuit on the basis of the phase angle.

* * * * *